(12) United States Patent  (10) Patent No.: US 10,756,844 B2
Hsieh  (45) Date of Patent: Aug. 25, 2020

(54) DEVICES AND METHOD FOR WIRELESSLY BROADCASTING MEDIA PACKETS

(71) Applicant: MEDIATEK INC., Hsinchu (TW)

(72) Inventor: Ming-Yi Hsieh, Taipei (TW)

(73) Assignee: MEDIATEK INC., Hsinchu (TW)

( * ) Notice: Subject to any disclaimer, the term of this patent is extended or adjusted under 35 U.S.C. 154(b) by 77 days.

(21) Appl. No.: 15/949,822

(22) Filed: Apr. 10, 2018

(65) Prior Publication Data
US 2018/0367243 A1  Dec. 20, 2018

Related U.S. Application Data

(60) Provisional application No. 62/532,388, filed on Jul. 14, 2017, provisional application No. 62/521,570, (Continued)

(51) Int. Cl.
*H04L 1/00*  (2006.01)
*H04W 4/80*  (2018.01)
(Continued)

(52) U.S. Cl.
CPC ............ *H04L 1/0041* (2013.01); *H04L 1/004* (2013.01); *H04L 1/0045* (2013.01); (Continued)

(58) Field of Classification Search
CPC ..... H04L 1/0041; H04L 1/004; H04L 1/0045; H04W 4/80
See application file for complete search history.

(56) References Cited

U.S. PATENT DOCUMENTS 8,768,252 B2  7/2014 Watson et al.
8,937,897 B2 * 1/2015 Hoshino ............... H04J 11/003
370/312
(Continued)

FOREIGN PATENT DOCUMENTS

WO  WO 2013/032578 A1  3/2013

OTHER PUBLICATIONS

Extended European Search Report dated Oct. 19, 2018 in Patent Application No. 18175912.7, 15 pages.
(Continued)

*Primary Examiner* — Esaw T Abraham
(74) *Attorney, Agent, or Firm* — Oblon, McClelland, Maier & Neustadt, L.L.P.

(57) ABSTRACT

Aspects of the disclosure provide a wireless encoding device, one or more wireless decoding devices, and a method for wirelessly broadcasting media packets. The wireless encoding device comprises an interface circuit and a controller. The interface circuit is configured to receive a bidirectional control signal and the media packets from a source device. The controller is configured to generate a unidirectional control signal based on the bidirectional control signal to enable each wireless decoding device to receive the media packets from the source device and at least one recovery packet from the interface circuit of the wireless encoding device. The controller also generates at least one recovery packet based on the media packets using an error correction technique to enable the one or more wireless decoding devices to recover distorted media packets received from the source device and to play the decoded media packets.

19 Claims, 9 Drawing Sheets

Related U.S. Application Data filed on Jun. 19, 2017, provisional application No. 62/520,610, filed on Jun. 16, 2017.

(51) Int. Cl.
   *H04N 21/442* (2011.01)
   *H04N 21/4363* (2011.01)
   *H04W 12/04* (2009.01)
   *H04W 72/04* (2009.01)

(52) U.S. Cl.
   CPC . *H04N 21/43637* (2013.01); *H04N 21/44227* (2013.01); *H04W 4/80* (2018.02); *H04W 12/04* (2013.01); *H04W 72/04* (2013.01); *H04L 1/0083* (2013.01); *H04L 2001/0093* (2013.01); *H04L 2209/80* (2013.01)

(56) References Cited

U.S. PATENT DOCUMENTS

| | | | |
|---|---|---|---|
| 9,020,437 B2 | 4/2015 | Watson et al. | |
| 9,241,334 B2* | 1/2016 | Hoshino | H04W 72/082 |
| 9,408,208 B2* | 8/2016 | Amini | H04W 24/04 |
| 9,621,987 B2 | 4/2017 | Watson et al. | |
| 9,674,817 B2* | 6/2017 | Lee | H04L 1/0045 |
| 9,843,413 B2* | 12/2017 | Badr | H04L 1/0009 |
| 9,894,638 B2* | 2/2018 | Lee | H04L 1/0045 |
| 10,003,435 B2* | 6/2018 | Lorca Hernando | H04L 1/0042 |
| 10,116,418 B2* | 10/2018 | Wu | H03M 13/3761 |
| 2009/0238375 A1 | 9/2009 | Pilati et al. | |
| 2011/0320214 A1 | 12/2011 | Pilati et al. | |
| 2012/0058727 A1 | 3/2012 | Cook et al. | |
| 2012/0290900 A1* | 11/2012 | Paniconi | H03M 13/353 714/776 |
| 2014/0136923 A1* | 5/2014 | Smith | H03M 13/05 714/762 |
| 2014/0281837 A1* | 9/2014 | Frigo | H04L 1/0041 714/776 |
| 2014/0329468 A1 | 11/2014 | Watson et al. | |
| 2015/0304770 A1 | 10/2015 | Watson et al. | |
| 2017/0188152 A1 | 6/2017 | Watson et al. | |
| 2018/0077493 A1 | 3/2018 | Watson et al. | |

OTHER PUBLICATIONS

Combined Office Action and Search Report dated May 5, 2019 in Taiwanese Patent Application No. 107120769 (with English translation of categories of cited documents).

* cited by examiner

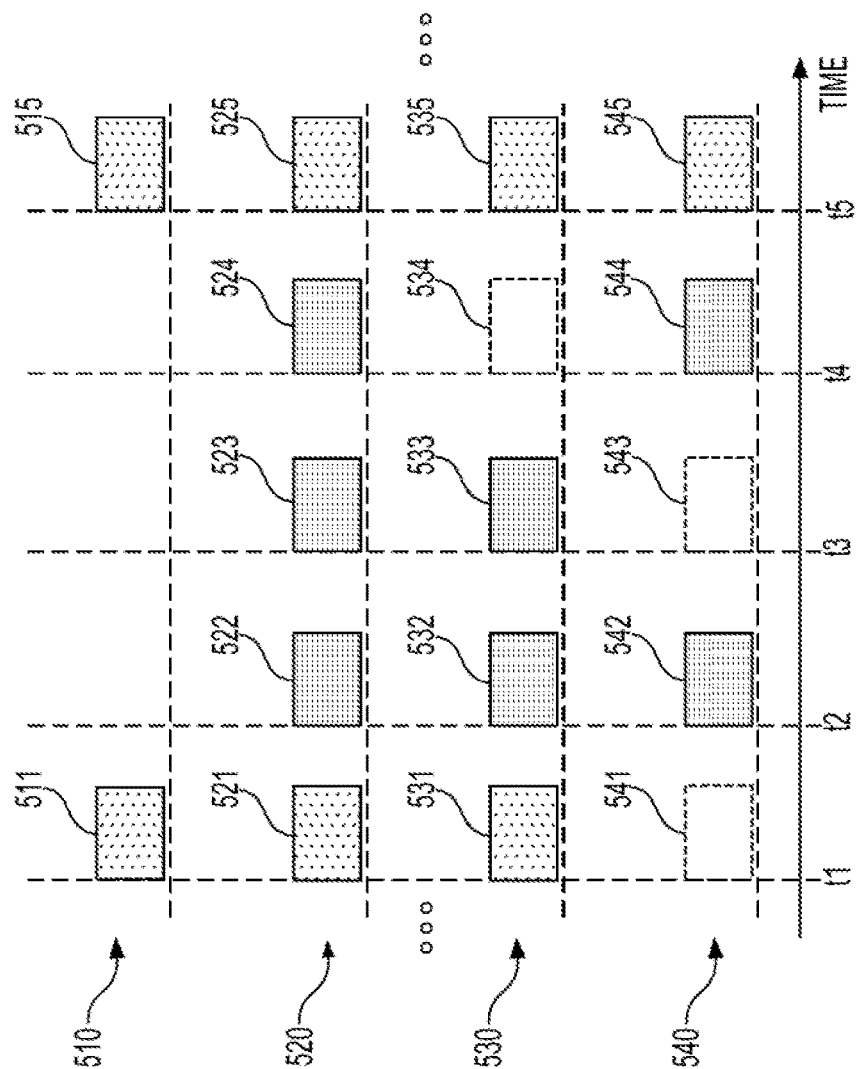
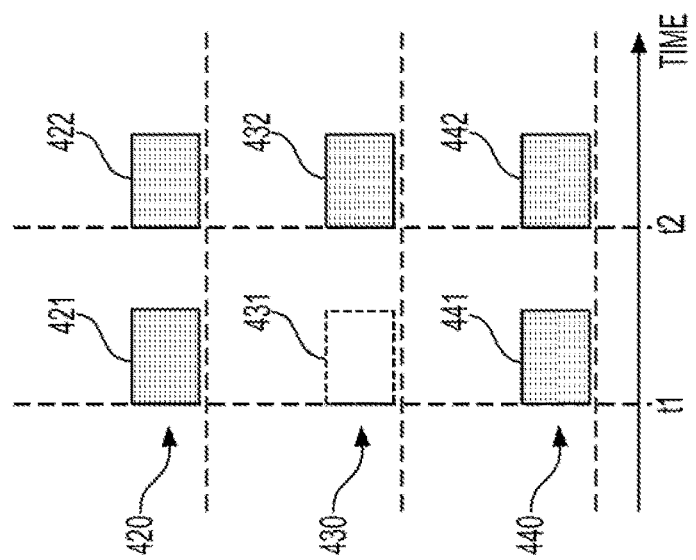
FIG. 5
FIG. 4

DEVICES AND METHOD FOR WIRELESSLY BROADCASTING MEDIA PACKETS

INCORPORATION BY REFERENCE

This present disclosure claims the benefit of U.S. Provisional Application No. 62/532,388, "Multiple Wireless Speaker Solution for Bluetooth" filed on Jul. 14, 2017, U.S. Provisional Application No. 62/521,570, "Reliable Broadcast Audio System" filed on Jun. 19, 2017, and U.S. Provisional Application No. 62/520,610, "Reliable Broadcast Audio System" filed on Jun. 16, 2017, which are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Wireless devices can transmit and receive signals wirelessly using one or more wireless communication standards in various networks, such as personal area network, local area network, metropolitan area network, wide area network, and the like. In an example, the signals including data packets such as video packets and multimedia packets can be broadcasted to wireless devices using a wireless communication standard. The signals can subsequently be played by the wireless devices.

SUMMARY

Aspects of the disclosure provide a wireless encoding device including an interface circuit and a controller. The interface circuit can be configured to receive a bidirectional control signal and media packets from a source device. The controller can be configured to generate a unidirectional control signal based on the bidirectional control signal to enable one or more wireless decoding devices to receive the media packets from the source device and at least one recovery packet from the interface circuit of the wireless encoding device. The controller can generate at least one recovery packet based on the media packets using an error correction technique to enable the one or more wireless decoding devices to recover distorted media packets received from the source device.

In an embodiment, the interface circuit of the wireless encoding device can be further configured to form a first bidirectional wireless communication channel with the source device based on the bidirectional control signal and to form a recovery unidirectional wireless communication channel with each of the one or more wireless decoding devices based on the unidirectional control signal. In an embodiment, the controller of the wireless encoding device is further configured to encrypt the unidirectional control signal.

In an embodiment, the interface circuit of the wireless encoding device is further configured to transmit at least one recovery packet and the unidirectional control signal and to receive the bidirectional control signal and the media packets using a wireless communication standard. In an example, the wireless communication standard is Bluetooth (IEEE 802.15.1).

In an embodiment, the wireless encoding device can further include one or more speakers configured to play the media packets.

In various embodiments, the interface circuit of the wireless encoding device is further configured to receive a source response from the source device that is based on one or more player responses received by the source device from the one or more wireless decoding devices, respectively. The controller of the wireless encoding device is further configured to adjust the error correction technique based on the source response. In an embodiment, the error correction technique is a packet-level forward error correction method.

Aspects of the disclosure provide a wireless decoding device including an interface circuit and a controller. The interface circuit can be configured to receive a unidirectional control signal and at least one recovery packet from a wireless encoding device and to receive media packets from a source device. The controller can be configured to process the unidirectional control signal to form a media unidirectional wireless communication channel between the wireless decoding device and the source device and a recovery unidirectional wireless communication channel between the wireless decoding device and the wireless encoding device. The controller is further configured to decode received media packets along with at least one recovery packet using an error correction technique to recover distorted media packets received from the source device.

In an embodiment, the interface circuit of the wireless decoding device is further configured to form the media unidirectional wireless communication channel with the source device and the recovery wireless communication channel with the wireless encoding device using a wireless communication standard. In an example, the wireless communication standard is Bluetooth (IEEE 802.15.1).

In an embodiment, the wireless decoding device further comprises one or more speakers to play the decoded media packets.

In an embodiment, the interface circuit of the wireless decoding device further includes a key to decrypt the unidirectional control signal encrypted by the wireless encoding device.

In an embodiment, the controller of the wireless decoding device can further comprise a response processor configured to generate a player response based on packet distortion of the unidirectional wireless communication channel. Further, the interface circuit of the wireless decoding device can further include a transmitter that is configured to enable the wireless decoding device to form a second bidirectional wireless communication channel with the source device. As a result, the unidirectional control signal can be transmitted from the wireless encoding device to the source device and then from the source device to the wireless decoding device over the second bidirectional wireless communication channel. Further, the player response can be transmitted from the wireless decoding device to the source device over the second bidirectional wireless communication channel and then a source response based on the one or more player responses is transmitted from the source device to the wireless encoding device.

Embodiments of the method for wirelessly playing media packets in one or more wireless decoding devices can include receiving a bidirectional control signal and the media packets from a source device by a wireless encoding device, generating a unidirectional control signal based on the bidirectional control signal by the wireless encoding device, and generating at least one recovery packet based on the media packets using an error correction technique by the wireless encoding device. The method can further include transmitting, by the wireless encoding device, the unidirectional control signal to enable the one or more wireless decoding devices to form a media unidirectional wireless communication channel with the source device and receive the media packets from the source device, and to enable the one or more wireless decoding devices to form a recovery unidirectional wireless communication channel with the wireless encoding device. The method also includes transmitting, by the wireless encoding device, at least one recovery packet that enables the one or more wireless decoding devices to recover distorted media packets received from the source device.

In an embodiment, the method further includes receiving the unidirectional control signal and at least one recovery packet transmitted by the wireless encoding device, as well as the media packets transmitted by the source device. The media unidirectional wireless communication channel between each wireless decoding device and the source device and the recovery unidirectional wireless communication channel between each wireless decoding device and the wireless encoding device are formed after each wireless decoding device receiving the unidirectional control signal. Further, the method includes decoding the received media packets along with at least one recovery packet using the error correction technique to recover the distorted media packets from the source device, and playing the decoded media packets by the wireless decoding device.

In an embodiment, the one or more wireless decoding devices are configured to include a key to decrypt the unidirectional control signal encrypted by the wireless encoding device.

Embodiments of the method can further include periodically receiving the unidirectional control signal from the wireless encoding device and initially receiving the unidirectional control signal from the wireless encoding device via a wired connection by the wireless decoding device.

Embodiments of the method can further include forming a first bidirectional wireless communication channel between the wireless encoding devices and the source device based on the bidirectional control signal and forming a second bidirectional wireless communication channel between each of the one or more wireless decoding devices and the source device. The method can further include transmitting the unidirectional control signal from the wireless encoding device to the wireless decoding device via the source device over the first and second bidirectional wireless communication channels. Further, the method can include transmitting one or more player responses from the one or more wireless decoding devices to the source device over the second bidirectional wireless communication channel and transmitting a source response based on the one or more player responses from the source device to the wireless encoding device over the first bidirectional wireless communication channel. In addition, the method can include adjusting the error correction technique based on the source response.

Aspects of the disclosure provide a wireless encoding device including an interface circuit and a controller. The interface circuit is configured to receive a bidirectional control signal and a media packet from a source device and to transmit a NAK signal to the source device after receiving the media packet from the source device for the first time to enable the source device to retransmit the media packet. The controller is configured to generate a unidirectional control signal based on the bidirectional control signal to enable one or more wireless decoding devices to receive the media packet from the source device, and to generate the NAK signal after receiving the media packet from the source device for the first time.

Aspects of the disclosure provide a method for wirelessly broadcasting media packets. The method can include receiving a bidirectional control signal from a source device by a wireless encoding device, and generating a unidirectional control signal based on the bidirectional control signal by the wireless encoding device. The method can also include transmitting the unidirectional control signal to one or more wireless decoding devices by the wireless encoding device. The method can further include receiving, by the one or more wireless decoding devices, the unidirectional control signal to form a media unidirectional wireless communication channel with the source device, and receiving a media packet from the source device by the wireless encoding device and the one or more wireless decoding devices. The method can include transmitting, by the wireless encoding device, a NAK signal to enable the source device to retransmit the media packet, and receiving, at the one or more wireless decoding devices, a retransmission of the media packet by the source device.

BRIEF DESCRIPTION OF THE DRAWINGS

Various embodiments of this disclosure that are proposed as examples will be described in detail with reference to the following figures, wherein like numerals reference like elements, and wherein:

FIG. 4 shows an example of communication of the UC control signal according to an embodiment of the disclosure;

FIG. 5 shows an example of communication of the control signals according to an embodiment of the disclosure;

DETAILED DESCRIPTION OF EMBODIMENTS

Figure 1:
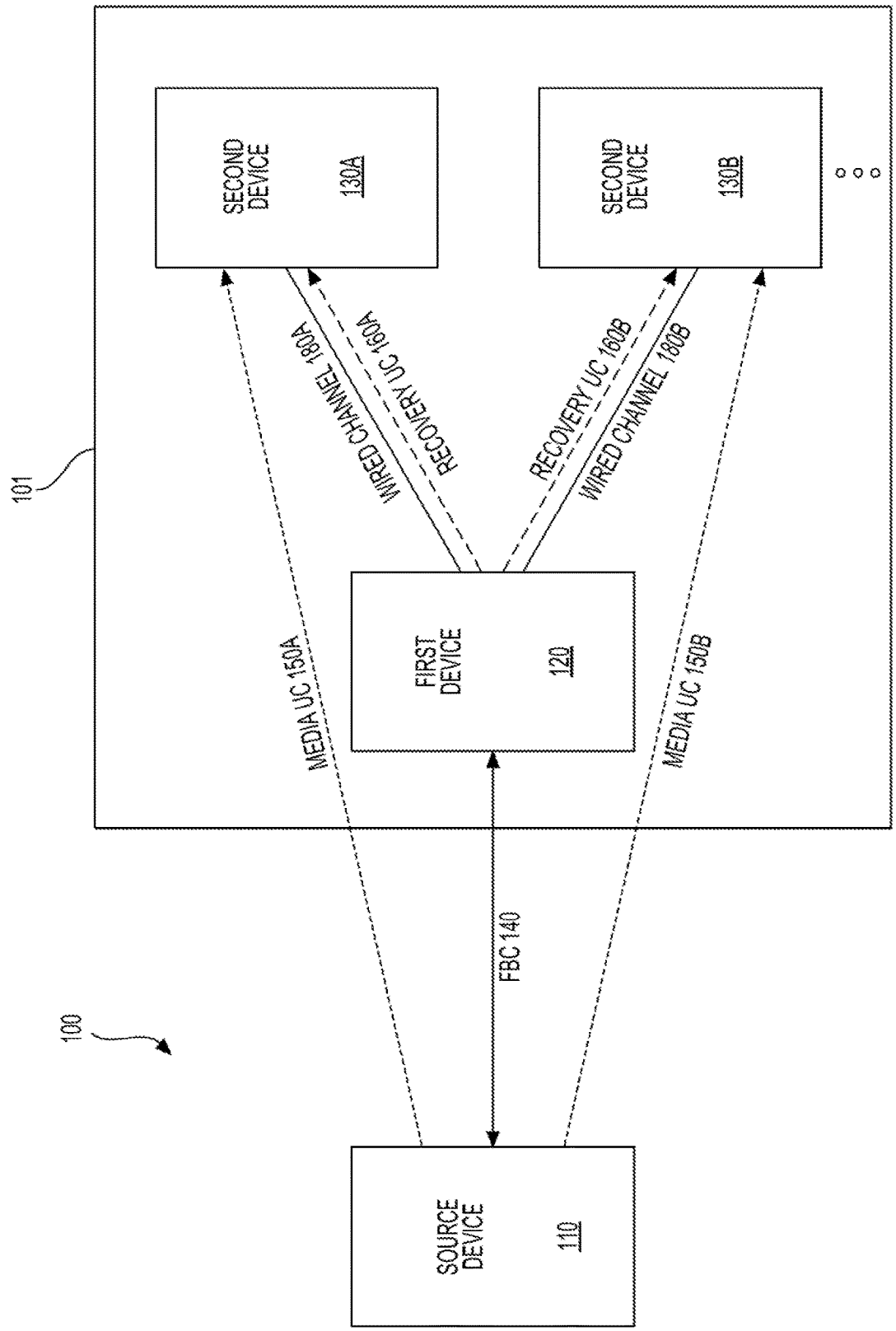
FIG. 1 shows an exemplary wireless communication system 100 according to an embodiment of the disclosure.

FIG. 1 shows an exemplary wireless communication system 100 according to an embodiment of the disclosure. The wireless communication system 100 can include a source device 110 and a wireless media system 101 including a first device 120 and one or more second devices 130A, 130B, and etc. In an embodiment, the second devices 130 can be configured to receive and play media packets transmitted wirelessly from the source device 110. In order to account for any packet distortion, such as packet loss, that the media packets may experience during transmission between the source device 110 and the second devices 130, error correction techniques, such as a packet-level forward error correction (FEC), can be implemented. For example, the first device 120 can be configured to receive the media packets from the source device 110, generate one or more recovery packets based on the media packets, and transmit the one or more recovery packets. The second devices 130 can receive the one or more recovery packets transmitted by the first device 120, decode the received media packets along with the one or more recovery packets to recover the media packets transmitted by the source device 110. As a result, the effect of the packet distortion can be reduced.

The media packets can be any form of data including audio packets, voice packets, video packets, multimedia packets, and the like or any combination thereof. Each second device 130 can further include suitable hardware components, software components, a combination of hardware and software components, and the like to play the media packets, such as speakers, display devices, and the like. In an embodiment, each second device 130 can include a speaker, and suitable electrical signals can be generated based on the media packets by each second device 130 and played by the speaker.

One or more wireless communication channels can be employed to communicate the media packets and the recovery packets in the wireless communication system 100. Further, in order to make communication between a single device and a plurality of second devices 130 more efficient, a unidirectional wireless communication channel can be used where the second devices 130 can receive but not transmit signals. In an embodiment, a media unidirectional channel (media UC) 150 can be used to wirelessly transmit signals from the source device 110 to each second device 130. Further, a recovery unidirectional channel (recovery UC) 160 can be used to wirelessly transmit signals from the first device 120 to each second device 130. The unidirectional channels (UCs) can include the media UCs 150 and the recovery UCs 160.

In an embodiment, a first bidirectional wireless communication channel or first bidirectional channel (FBC) 140, can be used between the source device 110 and the first device 120 to transmit signals, such as control signals to establish the UCs, as well as the media packets and the one or more recovery packets. As a result, the source device 110 and the first device 120 can transmit signals to and receive signals from each other.

The source device 110 and the first device 120 can be configured to use any suitable wireless communication standard to transmit and receive signals over the FBC 140. The second devices 130 can be configured to receive signals transmitted by the source device 110 and the first device 120 using any suitable wireless communication standard over the UCs. In an embodiment, the FBC 140 and the UCs can be configured to use the same wireless communication standard. In an example, a suitable wireless communication standard can be IEEE 802.11 or Wi-Fi, IEEE 802.15.1 or Bluetooth, or the like. For example, a Bluetooth piconet can be formed by the source device 110 and the first device 120, where the source device 110 and the first device 120 can be configured to be a master and a slave of the piconet, respectively. The second devices 130 can further be configured to receive signals from the source device 110 and the first device 120 over the UCs using Bluetooth.

Note that wired communication methods not shown in FIG. 1, such as via an electrical wire, a USB cable, local area network (LAN), fiber optical network, and the like, can also be used by the source device 110 and the first device 120 to communicate, for example, the control signals.

The control signals can be used to establish and maintain the FBC 140 and the UCs in the wireless communication system 100. In an embodiment, the control signals can include a FBC control signal and a UC control signal. In an embodiment, the FBC control signal can be transmitted by the source device 110 to the first device 120 to maintain the FBC 140, and include information, such as an address of the source device 110, timing and frequency information, and the like.

The UC control signal can be generated by the first device 120 based on the FBC control signal. Subsequently, the UC control signal can be transmitted by the first device 120 and received by the second devices 130 to form and maintain the UCs. The UC control signal can include information, such as addresses of the source device 110 and the first device 120, timing and frequency information, and the like.

In an embodiment, the UC control signal can be encrypted by the first device 120 and a UC key is required to receive the UC control signal. Therefore, the second devices 130 can be initialized to have the UC key. The initialization of the second devices 130 to have the UC key can be implemented using hardware, software, firmware, or a combination of aforementioned methods. The initialization of the second devices 130 to have the UC key can be implemented, for example, when the second devices 130 are manufactured, any time after manufacture, and the like. For purposes of this description, both the first device 120 and the second devices 130 can be initialized to have the UC key at the time of manufacture.

In an embodiment, the UC control signal can be transmitted wirelessly from the first device 120 to the second devices 130. In another embodiment, the UC control signal can be transmitted using wired communication, such as over wired channels 180A and 180B shown in FIG. 1. In an example, the UC control signal can be transmitted using the wired channels 180 to form the UCs, and then transmitted wirelessly to maintain the UCs.

In an embodiment, the control signals can further include a first bidirectional acknowledgement signal (FBC ACK signal) transmitted over the FBC 140 by the first device 120 to provide feedback of a status of the FBC 140. In an example, the FBC ACK signal can be an ACK, an acknowledgement of recipient of a media packet by the first device 120, an NAK, a negative-acknowledgement to indicate some kind of error, and the like. The source device 110 can respond accordingly, for example, by retransmitting the media packet after receiving the NAK and transmitting a next media packet after receiving the ACK.

As discussed above, to reduce the effect of the packet distortion of a wireless communication network, error correction techniques can be employed. In an embodiment, a backward error correction method or automatic repeat request (ARQ) can be employed for a bidirectional wireless communication channel when feedback signals, such as the FBC ACK signal, are available. For example, the FBC ACK signal followed by a response of the source device 110, can reduce the effect of packet distortion of the FBC 140. In another embodiment, a FEC can be employed for a unidirectional wireless communication channel due to, for example, lack of feedback signals. In an example, a packet-level FEC can be implemented using the one or more recovery packets transmitted over the recovery UC 160s to reduce the effect of the packet distortion over the media UC 150s.

The source device 110 can be any suitable device capable of wireless communication, such as a smartphone, a tablet, a computer, a wearable device, a media player, a base station, and the like. In an embodiment, the source device 110 can be configured to establish the FBC 140 with the first device 120 using any suitable wireless communication standard, such as IEEE 802.11 or Wi-Fi, IEEE 802.15.1 or Bluetooth, or the like. The source device 110 can further be configured not to receive signals from the second devices 130. In an example, the source device 110 can generate signals including the FBC control signal and transmit signals, such as the FBC control signal and the media packets, over the FBC 140. In addition, the source device 110 can receive signals including the FBC ACK signal from the first device 120, and respond accordingly. Further, in an example, the source device 110 can encode the media packets by various error correction techniques, such as bit-level FECs.

The first device 120 can be any suitable wireless encoding device. In an embodiment, the first device 120 can be configured to communicate with the source device 110 over the FBC 140 using any suitable wireless communication standard. The first device 120 can be configured not to receive signals from the second devices 130. The first device 120 can generate and transmit signals, such as the UC control signal and the FBC ACK signal, over the FBC 140. The first device 120 can further generate the one or more recovery packets based on the respective media packets using a suitable error correction technique, such as a packet-level FEC. In an example, the first device 120 can further include suitable hardware components, software components, a combination of hardware and software components, and the like to play the media packets, such as speakers, display devices, and the like. In an embodiment, the first device 120 can include a speaker, and suitable electrical signals can be generated based on the media packets by the first device 120 and played by the speaker. In an example, the first device 120 can be a wireless router, codec, a wireless display device, and a wireless speaker, such as a home wireless speaker, a headphone, an earbud, and the like.

The second devices 130 can be any suitable wireless decoding device. The second devices 130 can be configured to receive the UC control signal. In an example, the second devices 130 can establish the media UCs 150 with the source device 110. Therefore, the second devices 130 can be configured to receive signals transmitted by the source device 110, such as the media packets. In another example, the second devices 130 can establish the media UCs 150 with the source device 110 and the recovery UCs 160 with the first device 120. Therefore, the second devices 130 can be configured to receive signals transmitted by the source device 110 and the first device 120, such as the media packets and the one or more recovery packets. In an embodiment, the second devices 130 can also be initialized to have the UC key to receive the encrypted UC control signal. In addition, the second devices 130 can be configured not to transmit signals to the source device 110 and the first device 120. In an embodiment, the second devices 130 can decode the received media packets along with the one or more recovery packets using a suitable error correction technique, such as a packet-level FEC employed by the first device 120 to recover the media packets transmitted by the source device 110. Each second device 130 can further include suitable hardware components, software components, a combination of hardware and software components, and the like to play the decoded media packets, such as speakers, display devices, and the like. In an embodiment, each second device 130 can include a speaker, and suitable electrical signals can be generated based on the media packets by each second device 130 and played by the speaker. In one example, each second device 130 can be a wireless display device, a wireless speaker, such as a home wireless speaker, a headphone, an earbud, and the like.

In an embodiment, the wireless communication system 100 can be any suitable system configured to wirelessly play the media packets on, for example, the speakers of the second devices 130. In an embodiment, the wireless communication system 100 can include a plurality of second devices 130, such as the second devices 130A and 130B shown in FIG. 1. A number of second devices can be adjusted according to specific applications. Further, the first device 120 can also include one or more speakers. The physical locations of the first device 120 and the second devices 130 can be adjusted according to specific applications.

In an example, the wireless communication system 100 can have two groups of devices playing the media packets in a stereo mode, where a first group of devices can play a first audio channel and a second group of devices can play a second audio channel. Additionally, the wireless communication system 100 can include more than two groups of devices with each group playing an assigned channel, such as in a surround sound system. In addition, each group of devices can include one or more second devices, and one group of devices can also include the first device 120.

In an embodiment, the wireless media system 101 can include the first device 120 and the second device 130A. In an example, the first device 120 can further include a speaker. The first device 120 and the second device 130A can play the media packets using the respective speakers. In an example, the first device 120 and the second device 130A can be two wireless speakers, such as a wireless headphone having two speakers, a pair of wireless earbuds, and the like. In another example, the first device 120 and the second device 130A can be two wireless speakers connected via the wired channel 180A where the UC control signal can be transmitted from the first device 120 to the second device 130A via the wired channel 180A, establishing the UCs. In an example, the wired channel 180A can be formed when the first device 120 and the second device 130A are being charged by a charging station.

In another example, other devices (not shown) can be included in the wireless communication system 100, such as a Bluetooth piconet, where the source device 110 is a master and the first device 120 and the other devices are slaves. In addition, the second devices 130 can be configured to receive signals wirelessly transmitted from the source device 110, the first device 120, and the other devices.

During operation, the second devices 130 can be initialized to receive the UC control signal. The first device 120 and the source device 110 can be configured to form the FBC 140. The UC control signal can be generated and transmitted by the first device 120 based on the FBC control signal. Subsequently, the second devices 130 can receive the UC control signal and form the UCs with the source device 110 and the first device 120. Therefore, the second devices 130 can receive signals transmitted by the source device 110 and the first device 120. In one embodiment, the source deuce 110 is configured to transmit the media packets, such as audio packets, to the first device 120. The first device 120 is configured to receive the media packets and then generate the one or more recovery packets from the media packets. Subsequently, the one or more recovery packets are transmitted by the first device 120. Meanwhile, the second devices 130 are configured to receive the media packets and the one or more recovery packets from the source device 110 and the first device 120, respectively. In addition, the second devices 130 are configured to decode the received media packets along with the one or more recovery packets and play the decoded media packets using, for example, the speakers.

Figure 2:
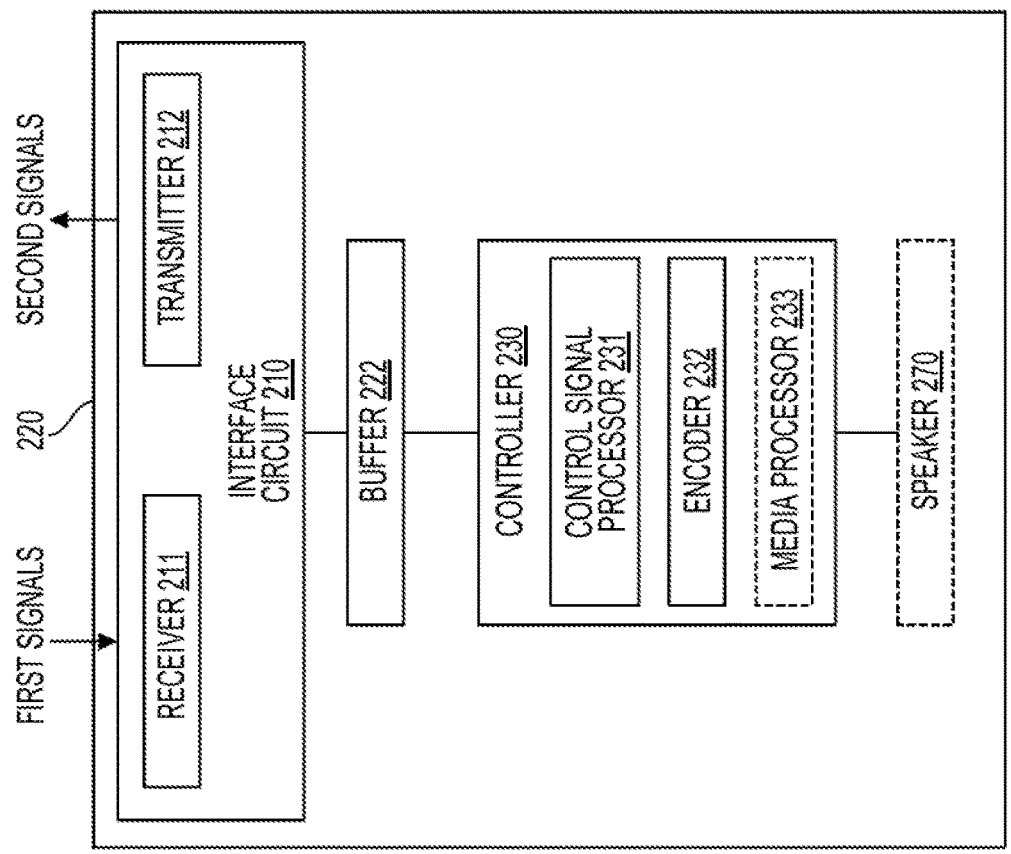
FIG. 2 shows an exemplary block diagram of a first device 220 according to an embodiment of the disclosure.

FIG. 2 shows an exemplary block diagram of a first device 220 according to an embodiment of the disclosure. The first device 220 can be any suitable wireless encoding device. The first device 220 can be configured to include an interface circuit 210, a buffer 222, and a controller 230. The interface circuit 210 can be configured to receive signals from and transmit signals to other devices, such as the source device 110, using wired, wireless, a combination of wired and wireless communication methods, and the like. The interface circuit 210 can further include a receiver 211 and a transmitter 212. The receiver 211 can receive first signals including, for example, the media packets and the FBC control signal from other devices, such as the source device 110. The receiver 211 can be any suitable wired, wireless, a combination of wired and wireless receiver, and the like. In an example, the receiver 211 can be a wireless receiver using any one or more suitable wireless communication standards, such as IEEE 802.11 or Wi-Fi, IEEE 802.15.1 or Bluetooth, and the like. In another example, the receiver 211 is a combination of wired and wireless receiver configured to receive, for example, the FBC control signals from the source device 110 over a wired connection and receive, for example, the media packets over the FBC 140 from the source device 110.

The transmitter 212 can transmit second signals including, for example, the UC control signal and the one or more recovery packets, to other devices, such as the source device 110. The transmitter 212 can be any suitable wired, wireless, a combination of wired and wireless transmitter, and the like. In an example, the transmitter 212 can be a wireless transmitter using any one or more suitable wireless communication standards, such as IEEE 802.11 or Wi-Fi, IEEE 802.15.1 or Bluetooth, and the like. In another example, the transmitter 212 is a combination of wired and wireless transmitter configured to transmit, for example, the UC control signal to the one or more second devices 130 over one or more wired connections and transmit, for example, the one or more recovery packets over the FBC 140 to the source device 110.

In an example, the receiver 211 and the transmitter 212 can be implemented using Bluetooth, such as in basic rate/extended data rate (BR/EDR) mode, light energy (LE) mode, and the like.

The buffer 222 is a memory used to buffer various signals. In one embodiment, the buffer 222 can be configured to buffer the FBC control signal, the UC control signal, the media packets, the one or more recovery packets, and the like. The buffer 222 can be located in a single memory chip or across multiple memory chips. In an example, the buffer 222 can include two FIFO (first in, first out) registers.

The controller 230 can include a control signal processor 231 and an encoder 232. The control signal processor 231 can generate the UC control signal based on the FBC control signal received from the source device 110. In an example, a Bluetooth piconet can be formed by the source device 110 and the first device 220, where the source device 110 is a master and the first device 220 is a slave. The UC control signal can thus include Bluetooth addresses of the source device 110 and the first device 220, Bluetooth clock information, a frequency hopping sequence of the source device 110, and the like. In another example, adaptive frequency hopping (AFH) is used by the Bluetooth piconet, and the UC control signal also includes an AFH map having frequencies used in the AFH.

In an embodiment, the encoder 232 can generate the one or more recovery packets based on the media packets using the error correction technique, such as a packet-level FEC. In an example, the packet-level FEC can be implemented using block codes, convolution codes, and the like. Redundancy of the error correction technique can also be dynamically adjusted according to for example the packet distortion of the UCs, such as packet loss rates of the UCs. In an embodiment, in an N/M packet-level FEC, N recovery packets are generated based on M media packets by the controller 230 (N and M are integers larger than zero). The redundancy of the N/M packet-level FEC, or the ratio N/M, can be dynamically adjusted according to the packet loss rates of the UCs. For example, 1/3 packet-level FEC can replace a 1/4 packet-level FEC when the packet loss rates of the UCs increases.

In another embodiment, the controller 230 can further include a media processor 233 configured to convert the media packets into suitable electrical signals that can be played by suitable devices, such as speakers, display devices, and the like. In an embodiment, the first device 220 can include one or more speakers, such as a speaker 270. The media processor 233 can convert the media packets into suitable electrical signals played by a speaker 270.

During operation, the receiver 211 can receive the first signals including the FBC control signal from the source device 110 using wired, wireless, a combination of wired and wireless communication methods, and the like, and enable the establishment of the FBC 140 between the source device 110 and the first device 220. In addition, the receiver 211 can receive the media packets from the source device 110 using a suitable wireless communication standard, such as Bluetooth, over the FBC 140. The first signals can be buffered in the buffer 222 and sent to the controller 230 for further processing. For example, the control signal processor 231 can generate the UC control signal based on the FBC control signal, and the encoder 232 can generate the one or more recovery packets based on the media packets using, for example, a packet-level FEC. The UC control signal and the one or more recovery packets can subsequently be sent to the buffer 222. The transmitter 212 can transmit the second signals including the UC control signal and the one or more recovery packets over the FBC 140. In another example, the transmitter 212 can be configured to transmit the UC control signal via one or more wired connections between the first device 220 and the one or more second devices 130. In an example, the UC control signal, when received by the second devices 130, can be used to form the media UCs 150 between the source device 110 and the second devices 130. In addition, the UC control signal, when received by the second devices 130, can be used to form the recovery UCs 160 between the first device 120 and the second devices 130. Further, the one or more recovery packets can be received by other devices, such as the second devices 130, thus, reduce the effect of the packet distortion over the media UCs 150. In an embodiment, the first device 120 in the wireless communication system 100 can be implemented by the first device 220.

Figure 3:
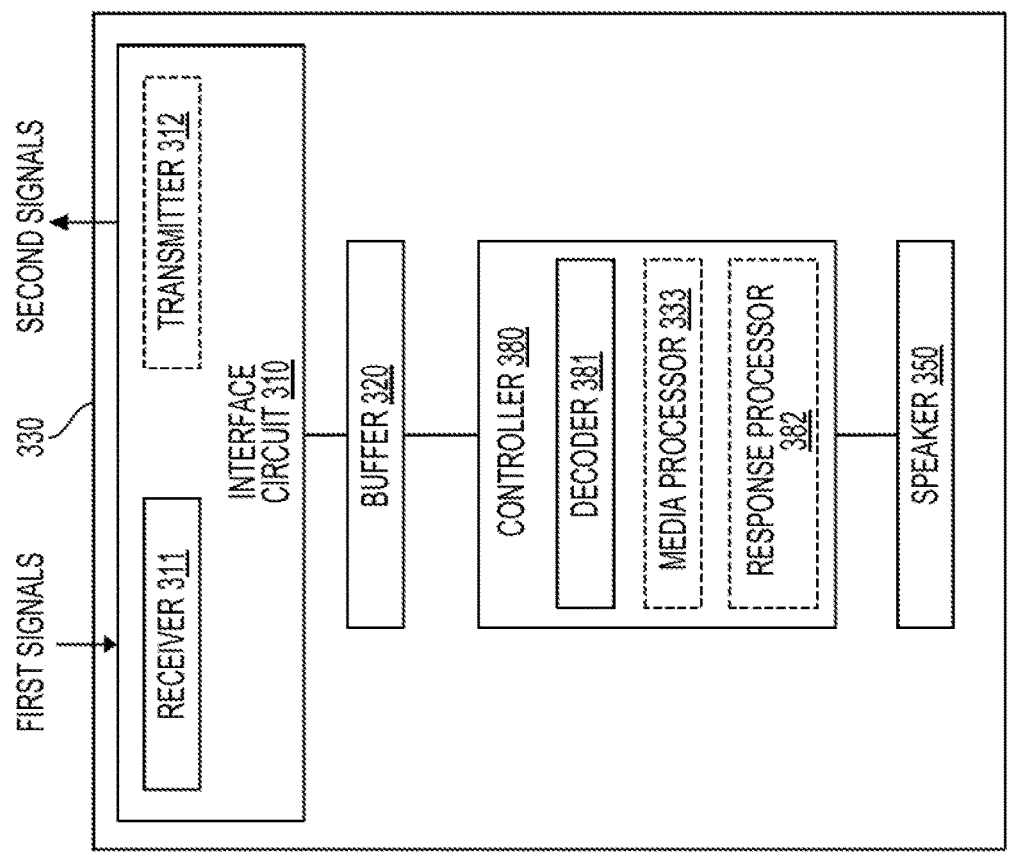
FIG. 3 shows an exemplary block diagram of a second device 330 according to an embodiment of the disclosure.

FIG. 3 shows an exemplary block diagram of a second device 330 according to an embodiment of the disclosure. The second device 330 can be any suitable wireless decoding device. The second device 330 can include an interface circuit 310, a buffer 320, and a controller 380. The interface circuit 310 can receive first signals from other devices, such as the source device 110 and the first device 220, using wired, wireless, a combination of wired and wireless communication methods, and the like. The interface circuit 310 can further include a receiver 311. The receiver 311 can receive the first signals including, for example, the UC control signal, the media packets, and the one or more recovery packets from other devices, such as the source device 110 and the first device 220. The receiver 311 can be any suitable wired, wireless, a combination of wired and wireless receiver, and the like. In an example, the receiver 311 can be a wireless receiver using any one or more suitable wireless communication standards, such as IEEE 802.11 or Wi-Fi, IEEE 802.15.1 or Bluetooth, and the like. In another example, the receiver 311 is a combination of wired and wireless receiver configured to receive, for example, the UC control signal from the first device 220 over a wired connection and receive, for example, the media packets, over the media UCs 150.

The buffer 320 is a memory used to buffer various signals. In one embodiment, the buffer 320 can be configured to buffer the UC control signal, the media packets, and the like. In an example, the buffer 320 can further be configured to buffer the one or more recovery packets. The buffer 320 can be located in a single memory chip or across multiple memory chips. In an example, the buffer 320 can include two FIFO (first in, first out) registers.

The controller 380 can include a decoder 381. The decoder 381 can decode the received media packets along with the one or more recovery packets using a suitable decoding method in order to recover the media packets transmitted by the source device 110. In an embodiment, the decoding method, such as a packet-level decoding method, can be chosen to match the error correction technique used by the encoder 232 in the first device 220. When the redundancy of the error correction technique is dynamically adjusted, for example, by the encoder 232 in the first device 220, the decoding method can be dynamically adjusted by the decoder 381 of the second device 330 accordingly. In an example, the decoded media packets can have less packet distortion than that of the received media packets.

In an embodiment, the second device 330 can include one or more suitable devices, such as speakers, display devices, and the like, to play the decoded media packets. The controller 330 can further include a media processor 333 configured to convert the media packets into suitable electrical signals that can be played by the suitable devices. In an example, the second device 330 can include one or more speakers, such as a speaker 350. The media processor 333 can convert the media packets into suitable electrical signals played by the speaker 350.

In another embodiment, the controller 380 can further include a response processor 382. The response processor 382 can be configured to generate a player response to indicate, for example, the packet distortion of the UCs. Further, the interface circuit 310 can include a transmitter 312. The transmitter 312 can be any suitable wired, wireless, a combination of wired and wireless transmitter, and the like. The transmitter 312 can be configured to transmit second signals including the player response to other devices. In an example, the transmitter 312 can be a wireless transmitter using any one or more suitable wireless communication standards, such as IEEE 802.11 or Wi-Fi, IEEE 802.15.1 or Bluetooth, and the like.

In an example, the receiver 311 and the transmitter 312 can be implemented using Bluetooth, such as in BR/EDR mode, LE mode, and the like.

In an embodiment, the second devices 130 in the wireless communication system 100 can be implemented using the second devices 330.

During operation, the receiver 311 can receive the first signals from other devices, such as the first device 220, using wired, wireless, a combination of wired and wireless communication methods, and the like. The first signals can include the UC control signal, the media packets, and the one or more recovery packets. The UC control signal enables the establishment of the media UC 150 between the source device 110 and the second device 330 and the recovery UC 160 between the first device 220 and the second device 330. In addition, the receiver 311 can receive signals from the source device 110 and the first device 220 over the media UC and the recovery UC, respectively, using a suitable wireless communication standard, such as Bluetooth.

The decoder 381 can decode the received media packets along with the one or more recovery packets using a suitable decoding method that matches the error correction technique, such as a packet-level FEC, employed by the first device 220. In an example, the decoded media packets can have less packet distortion than that of the received media packets. Subsequently, the media processor 333 can be configured to convert the decoded media packets into suitable electrical signals that can be played by the speaker 350.

To form the UCs between the one or more second devices 130 with a single device, such as the source device 110 or the first device 120, the UC control signal can be transmitted one or multiple times by the first device 120 and received by the one or more second devices 130. For example, to reduce the effect of the packet distortion, the UC control signal can be transmitted multiple times.

FIG. 4 shows an example of communication of the UC control signal according to an embodiment of the disclosure. In an example, the wireless communication system 100 can be configured to perform the communication shown in FIG. 4. As shown, the X-axis represents time while the Y-axis represents the communication of the UC control signal for the first device 120 (row 420), and the second devices 130A (row 430) and 130B (row 440), respectively.

Prior to time t1, the first device 120 can generate the UC control signal based on the FBC control signal. In addition, the second devices 130 can be initialized to have the UC key to receive encrypted signals from the first device 110, such as the encrypted UC control signal.

In an example shown in FIG. 4, the first device 120 transmits two UC control signals 421 and 422 at times t1 and t2, respectively. In an example, the UC control signals 421 and 422 are identical. At time t1, the second device 130B receives a signal 441, equivalent to the UC control signal 421. However, the second device 130A receives a corrupted signal 431. Note that a received signal, such as the signal 441, is equivalent to a transmitted signal, such as the UC control signal 421, when the transmitted signal can be recovered from the received signal, for example, when the received signal is identical to the transmitted signal. On the other hand, the transmitted signal, such as the UC control signal 421, cannot be recovered from a corrupted signal, such as the signal 431. In an example, an empty packet is a corrupted signal.

As a result, the UCs are formed between the second device 130B and the source device 110, as well as between the second device 130B and the first device 120. The UCs, however, are not formed between the second device 130A and the source device 110 or the second device 130A and the first device 120.

In an example, at time t2, the second devices 130A and 130B receive signals 432 and 442, equivalent to the UC control signal 422. As a result, the UCs are also formed between the second device 130A and the source device 110, as well as the second device 130A and first device 120.

As discussed above, for the second device 130A, the second UC control signal received at the time t2 leads to the formation of the UCs though the packet distortion at the time t1 prevents the formation of the UCs.

The control signals, such as the FBC control signal, can change over time, for example, when a master of a Bluetooth piconet changes control information, such as timing and frequency information. In another example, in a Bluetooth piconet, the first device 120 (the slave) can lose synchronization if not receiving a packet from the source device 110 (the master) at least, for example, every 200 ms. Further, as discussed above, to reduce the effect of packet distortion over the UCs, the UC control signal can be transmitted multiple times following a respective FBC control signal. Accordingly, in an embodiment, the FBC control signal can be updated and transmitted periodically, followed by one or mote UC control signals in the wireless communication system 100.

FIG. 5 shows an example of communication of the control signals according to an embodiment of the disclosure. In an example, the wireless communication system 100 can be configured to perform the communication shown in FIG. 5. Again, the X-axis represents time, and the Y-axis represents the communication of the control signals for the source device 110 (row 510), the first device 120 (row 520) and the second devices 130A (row 530) and 130B (row 540), respectively.

Prior to time t1, the FBC 140 and the UCs are formed, and the first device 120 and each second device 130 can receive signals from the source device 110.

At time t1, a FBC control signal 511 is transmitted from the source device 110 to the first device 120. The first device 120 and the second device 130A receive signals 521 and 531, equivalent to the FBC control signal 511. The second device 130B, however, receives a corrupted signal 541.

In response to the FBC control signal 511 and to reduce the effect of packet distortion, the first device 120 transmits three UC control signals 522-524 at times t2-t4, respectively, to maintain the UCs. In an example, the UC control signals 522-524 can be identical.

For example, at time t2, the second devices 130A and 130B receive signals 532 and 542, equivalent to the UC control signal 522. At time t3, the second device 130A receives a signal 533, equivalent to the UC control signal 523. The second device 130B receives a corrupted signal 543. At time t4, the second device 130B receives a signal 544, equivalent to the UC control signal 524. The second device 130A receives a corrupted signal 534. At time t5, a next FBC control signal 515 is transmitted by the source device 110 and received by the first device 120 and the second devices 130 as 525, 535, and 545, equivalent to the FBC control signal 515.

In an embodiment, a FBC period can be an interval between two adjacent FBC control signals, such as an interval between times t1 and t5. In an example, one FBC control signal and one or more UC control signals based on the FBC control signal can be transmitted during one FBC period. In the FIG. 5 example, the FBC period includes the transmission of the FBC control signal 511 and the three UC control signals 522-524 at times t1-t4, respectively. The FBC period starts at the time t1 and ends at the time t5 when the next FBC control signal 515 arrives.

Transmission and reception of the control signals in one FBC period by the source device 110, the first device 120, and each second device 130 are discussed below. Row 510 shows the transmission of the FBC control signal by the source device 110. The source device 110 transmits the FBC control signal 511 at time t1.

Row 520 shows the transmission and reception of the control signals by the first device 120. The first device 120 receives the signal 521, equivalent to the FBC control signal 511, and subsequently transmits three UC control signals 522-524 at times t2-t4, respectively.

Row 530 shows the reception of the control signals by the second device 130A. The second device 130A receives the signal 531-533, equivalent to the FBC control signal 511 and the UC control signals 522-523, at times t1-t3, respectively, and the corrupted signal 534 at time t4. As a result, the second device 130A remains access to the UCs from time t1 to time t4. Different scenarios can happen between times t4 and t5. For example, in a first scenario, the second device 130A remains access to and receives signals over the UCs. In a second scenario, the second device 130A does not have access to the UCs, thus stops receiving signals between times t4 and t5, for example, due to synchronization issue.

Row 540 shows the reception of the control signals by the second device 130B. The second device 130B receives the corrupted signals 541 and 543 at times t1 and t3, respectively. The second device 130B receives the signals 542 and 544 at times t2 and t4, respectively. In one example when an updated AFH map is included in the FBC control signal 511, the second device 130B loses access to the UCs at time t1, resumes access to the UCs at time t2. In an example, the second device 130 loses access to the UCs at time t3 due to synchronization issue, and resumes access to the UCs at time t4. The second device 130B can resume access to the UCs during the FBC period despite receiving corrupted UC control signals because the UC control signals are transmitted multiple times in one FBC period.

Duration of the FBC period can vary depending on the wireless communication standard employed in the wireless communication system 100. In an example, a Bluetooth standard with an AFH is used by the FBC 140. The FBC period can be related to a polling interval $T_{poll}$ and one time slot where the $T_{poll}$ is at least the longest poll interval for the FBC 140 and one time slot is 0.625 milliseconds (ms). For example, the FBC period can be at least $6T_{poll}$ or 96 time slots (60 ms).

The UC period, an interval between two adjacent UC control signals, such as an interval between times t2 and t3, can vary depending on the wireless communication standard employed in the wireless communication system 100. In an example, the UC period can vary between 100 to 300 ms.

Both the FBC period and the UC period can change over time. For example, the time interval between times t2 and t3 can be 100 ms while the time interval between times t3 and t4 can be 200 ms.

As discussed above, signals can be transmitted at various times such as times t1-t5 in FIG. 5. In an embodiment, specific time slots used to transmit signals, such as the control signals, the media packets, and the one or more recovery packets, can depend on the wireless communication standard. In an example, a Bluetooth piconet is formed between the source device 110 and the first device 120 with the source device 110 as a master and the first device 120 as a slave. The master (the source device 110) and slave (the first device 120) can transmit signals alternatively using time-multiplexing. For example, the FBC 140 is divided into time slots, each having 0.625 ms, as discussed above. The time slots are numbered, for example, from 0 to $2^{27}-1$ and the slot numbering is cyclic with a period of $2^{27}$. In an example, the source device 110 can transmit in even-numbered time slots, and the first device 120 can transmit in odd-numbered time slots. Signals can use 1, 3, or 5 time slots. For example, each control signal in FIG. 5 can be a packet using one time slot, thus, the packets 511 and 515 can be transmitted by the source device 110 a zeroth and fourth time slots while the packets 522, 523, and 524 can be transmitted by the first device 120 at the first time slot and last three time slots.

Figure 6:
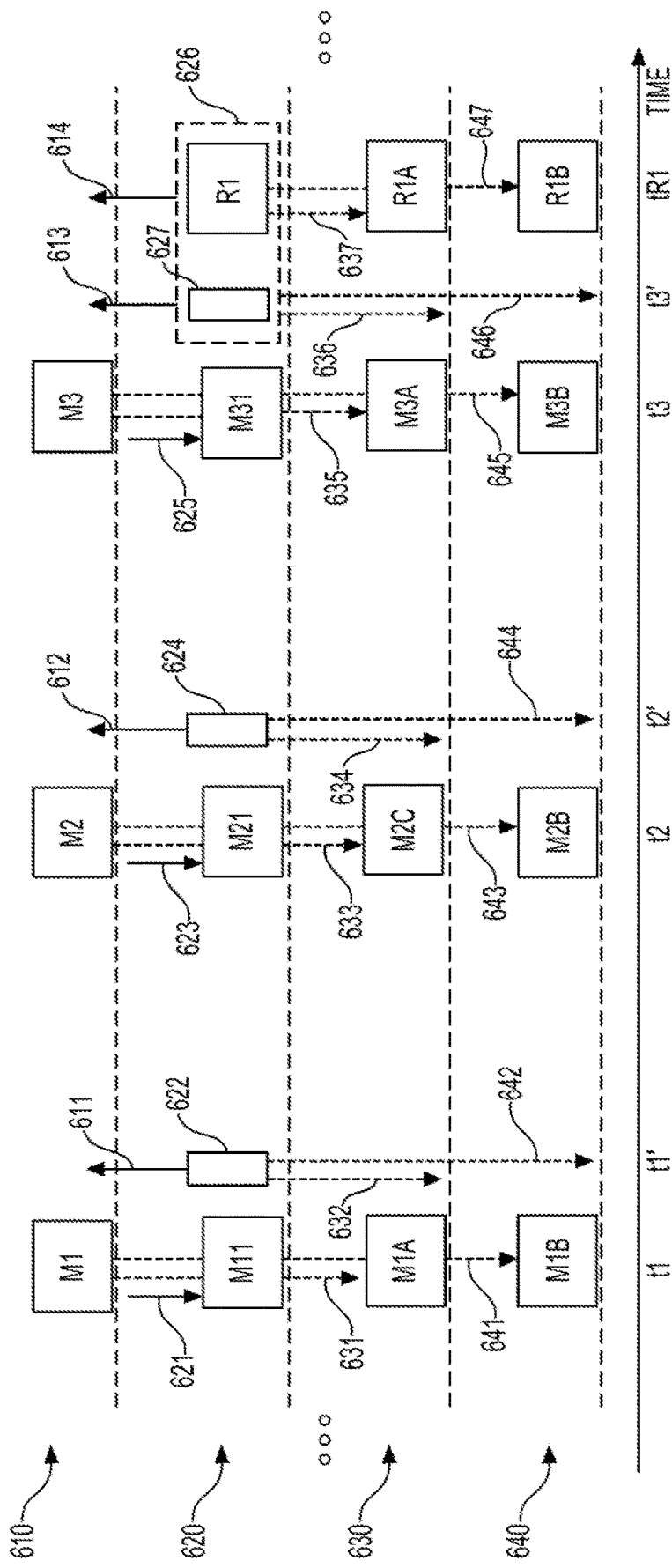
FIG. 6 shows an example of communication of media packets and a recovery packet according to an embodiment of the disclosure.

FIG. 6 shows an example of communication of media packets and a recovery packet according to an embodiment of the disclosure. In an example, the wireless communication system 100 can be configured to perform the communication shown in FIG. 6 when the FBC 140 and the UCs are formed. The X-axis represents time, and the Y-axis represents the communication of the media packets and the recovery packet for the source device 110 (row 610), the first device 120 (row 620), and the second devices 130A (row 630) and 130B (row 640), respectively.

In the example show in in FIG. 6, a 1/3 packet-level FEC is implemented where the first device 120 is configured to generate a recovery packet R1 based on three media packets M1-M3 transmitted from the source device 110. Further, each second device 130 is configured to recover the three media packets M1-M3 if packets received by each second device 130 are equivalent to at least three out of the four packets transmitted by the source device 110 and the first device 120, i.e. the three media packets M1-M3 and the recovery packet R1.

At time t1, the media packet M1 is transmitted from the source device 110 to the first device 120 over the FBC 140, as indicated by an arrow 621, as well as to the second devices 130A and 130B over the media UCs 150, as indicated by arrows 631 and 641, respectively. As shown in FIG. 6, packets M11, M1A, and M1B, equivalent to the media packet M1 are received by the first device 120 and the second devices 130.

At a later time t1', a FBC ACK signal 622 is transmitted from the first device 120 to the source device 110 over the FBC 140, as indicated by an arrow 611, as well as to the second devices 130, as indicated by arrows 632 and 642. In the example, the FBC ACK signal 622 is an ACK, an acknowledgement of the recipient of the media packet M1 by the first device 120. As a result, the source device 110 does not retransmit the media packet M1.

At time t2, a media packet M2 is transmitted from the source device 110 to the first device 120 over the FBC 140, as indicated by an arrow 623, as well as to the second devices 130A and 130B over the media UCs 150, as indicated by arrows 633 and 643, respectively. As shown in FIG. 6, packets M21 and M2B, equivalent to the media packet M2 are received by the first device 120 and the second device 130B. The second device 130A receives a corrupted packet M2C, for example, M2C is an empty packet due to packet loss.

At a later time t2', a FBC ACK signal 624 is transmitted from the first device 120 to the source device 110 over the FBC 140, as indicated by an arrow 612, as well as to the second devices 130, as indicated by arrows 634 and 644. In the example, the FBC ACK signal 624 is an ACK. As a result, the source device 110 does not retransmit the media packet M2.

At time t3, a media packet M3 is transmitted from the source device 110 to the first device 120 over the FBC 140, as indicated by an arrow 625, as well as to the second devices 130A and 130B over the media UCs 150, as indicated by arrows 635 and 645, respectively. In the example shown in FIG. 6, packets M31, M3A, and M3B, equivalent to the media packet M3 are received by the first device 120 and the second devices 130.

At a later time t3', a FBC ACK signal 627 is transmitted irons the first device 120 to the source device 110 over the FBC 140, as indicated by an arrow 613, as well as to the second devices 130, as indicated by arrows 636 and 646. In the example, the FBC ACK signal 627 is an ACK. In the example shown in FIG. 6, the FBC ACK signal 627 is received by the source device 110. As a result, the source device 110 does not retransmit the media packet M3.

At a later time tR1, the recovery packet R1 is transmitted from the first device 120 to the source device 110 and the second devices 130, as indicated by the arrows 614, 637, and 647, respectively. In the example shown in FIG. 6, packets R1A and R1B, equivalent to the recovery packet R1, are received by the second devices 130.

Row 610 shows the transmission and reception of signals by the source device 110. For example, the source device 110 transmits the three media packets M1-M3 at times t1-t3, respectively. In addition, the source device 110 receives the three ACKs transmitted at times t1'-t3', respectively. As a result, the source device 110 does not retransmit the three media packets M1-M3.

Row 620 shows the transmission and reception of signals by the first device 120. In an example, the first device 120 receives the three packets M11, M21, and M31, equivalent to the media packets M1-M3, respectively. In an example, the three packets M11, M21, and M31 are identical to the media packets M1-M3, respectively. In another example, the media packets M1-M3 can be retrieved from the three packets M11, M21, and M31. As a result, the recovery packet R1 is generated based on the media packets M1-M3 and then transmitted by the first device 120 at time tR1. The first device 120 also transmits the ACKs at times t1'-t3'.

Row 630 shows the reception of signals by the second device 130A. In an example, the second device 130A receives packets M1A and M3A, equivalent to the media packets M1 and M3, and the corrupted packet M2C. As a result, the second device 130A experiences packet distortion. In addition, the second device 130A receives the packet R1A, equivalent to the recovery packet R1. The packets M1, M3, and R1 can be retrieved from M1A, M3A, and R1A, respectively. As a result, the media packets M1-M3 can be recovered by the second device 130A based on three packets, M1, M3, and R1. In the example shown in FIG. 6, the packet distortion has no effect on the second device 130 because of the 1/3 packet-level FEC.

Row 640 shows the reception of signals by the second device 130B. The second device 130B receives the packets M1B, M2B, M3B, and R1B, equivalent to the media packets M1, M2, and M3 and the recovery packet R1, respectively. There is no packet distortion for the second device 130B.

In the example shown in FIG. 6, the ACK signal 627 and the recovery packet R1 are transmitted separately. In another example, the ACK signal 627 and the recovery packet R1 can be combined into a single packet, as shown by a packet 626. In another example, a header indicating arrival of a recovery packet can be included in 627 or the recovery packet R1. When the source device 110 receives the header of 627 or the recovery packet R1, the source device 110 can discard the recovery packet R1 or the remainder of the recovery packet R1, respectively.

In the example shown in FIG. 6, a backward error correction method is employed in the FBC 140. For example, the first device 120 receives the packets M11, M21, and M31 and transmits the ACKs at times t1'-t3', respectively. In another example not show in FIG. 6, the first device 120 can transmit an NAK when the first device 120, for example, misses a media packet. Subsequently, the source device 110 can retransmit the media packet.

A 1/3 packet-level FEC for the UCs is also shown in FIG. 6. In another example not shown in FIG. 6, a different error correction technique can be employed for the UCs, such as a 1/4 packet-level FEC when the packet loss rate decreases, a 2/5 packet-level FEC when the packet loss rate increases, and the like.

Figure 7:
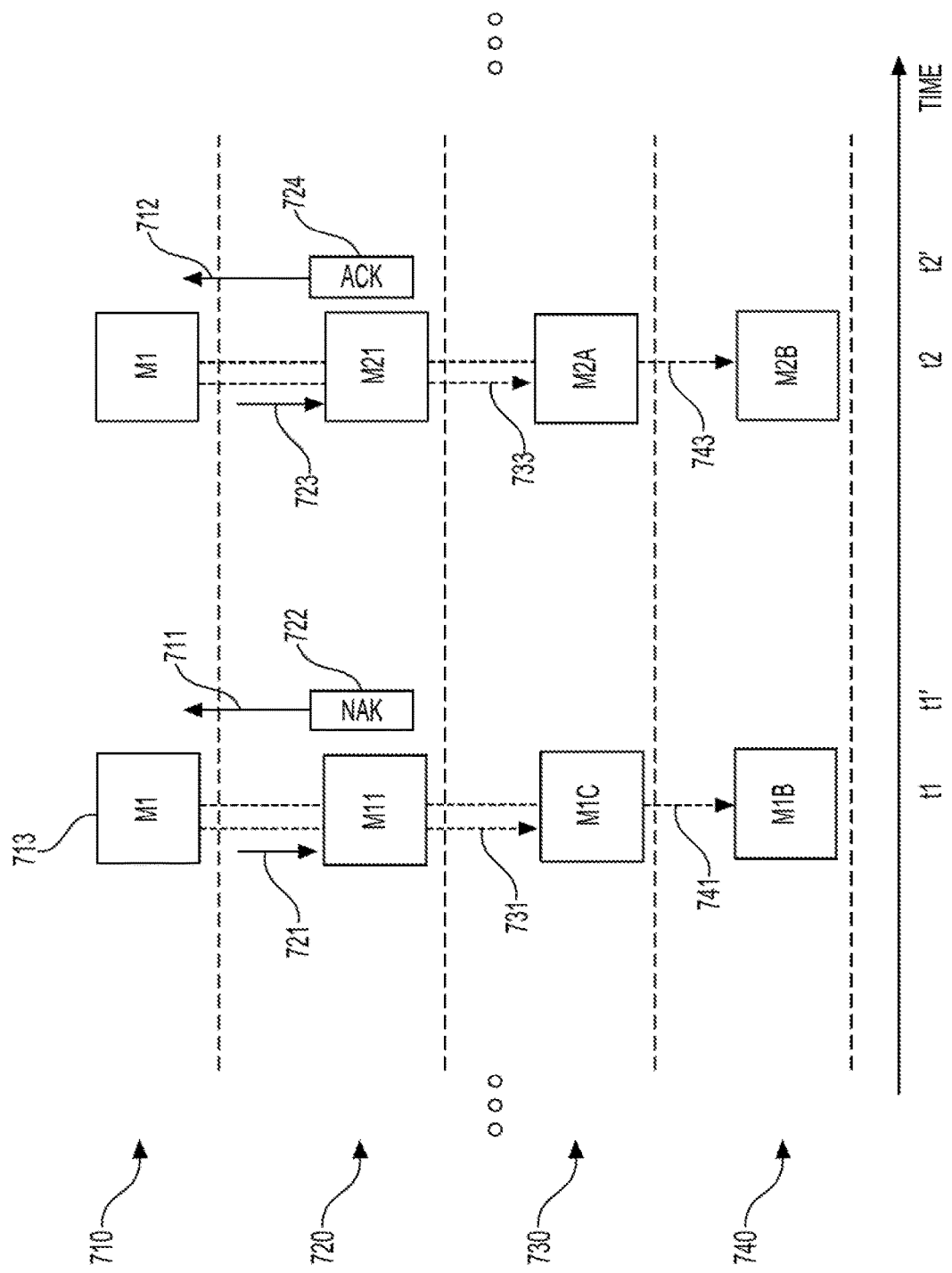
FIG. 7 shows an example of at least one retransmission of each media packet according to an embodiment of the disclosure.

A FEC such as the 1/3 packet-level FEC shown in FIG. 6, can be implemented to reduce the effect of the packet distortion of media packets, such as audio packets. In another embodiment, at least one retransmission of each media packet can be used to reduce the effect of the packet distortion of media packets, such as voice packets. FIG. 7 shows an example of at least one retransmission of each media packet according to an embodiment of the disclosure. In an example, the wireless communication system 100 can be configured to perform the retransmission shown in FIG. 7 when the FBC 140 and the UCs are formed. The X-axis represents time, and the Y-axis represents communication of the media packets and the FBC ACK signals for the source device 110 (row 710), the first device 120 (row 720), and the second devices 130A (row 730) and 130B (row 740), respectively.

At time t1, a media packet M1 713 is transmitted from the source device 110 to the first device 120 over the FBC 140, as indicated by an arrow 721, as well as to the second devices 130A and 130B over the media UCs 150, as indicated by arrows 731 and 741, respectively. In the example shown in FIG. 7, packets M11 and M1B, equivalent to the media packet M1, are received by the first device 120 and the second device 130B, respectively. The second device 130A receives a corrupted packet M1C, such as an empty packet.

At a later time t1', a FBC ACK signal 722, is transmitted from the first device 120 to the source device 110 over the FBC 140, as indicated by an arrow 711. In an embodiment, the FBC ACK signal 722 transmitted after a first media packet, such as the media packet 713 is a NAK, a negative-acknowledgement, even when the first device 120 receives the first media packet.

At time t2, in response to the NAK, the source device 110 retransmits the media packet M1 over the FBC 140 to the first device 120, as indicated by the arrow 723, as well as to the second devices 130A and 130B over the media UCs 150, as indicated by arrows 733 and 743, respectively. In the example shown in FIG. 7, packets M21, M2A, and M2B, equivalent to the media packet M1, are received by the first device 120 and the second devices 130, respectively.

At a later time t2', a FBC ACK signal 724, is transmitted from the first device 120 to the source device 110 over the FBC 140, as indicated by an arrow 712. In an embodiment, the FBC ACK signal transmitted after the retransmission of the media packet, such as the media packet M1, can be an ACK or a NAK depending on the specific situation. In the example in FIG. 7, an ACK is transmitted because the first device 120 receives the packet M21. Therefore, the source device 110 stops retransmitting the media packet M1.

Row 730 shows the transmission and reception of signals by the source device 110. The source device 110 transmits the media packet M1 at time t1, and at least retransmits the media packet M1 one time at time t2 in order to reduce the effect of the packet distortion over each media UC 150. The source device 110 receives the ACK after time t2', and stops retransmitting the media packet M1.

Row 720 shows the transmission and reception of signals by the first device 120. The first device 120 receives the packet M11 at times t1. However, the first device 120 is configured to transmit the NAK at time t1' so that the effect of the packet distortion for other devices, such as the second devices 130 over the media UCs 150, can be reduced. The first device 120 receives the media packet M21, and subsequently transmits the ACK at time t2' to acknowledge the recipient of the packet M21.

Row 730 shows the reception of signals by the second device 130A. In an example, the second device 130A receives the corrupted packet M1C and the packet M2A transmitted at times t1 and t2, respectively. The packet distortion due to the corrupted packet M1C has no effect because the media packet M1 is retransmitted one time and subsequently received by the second device 130A.

Row 740 shows the reception of signals by the second device 130B. The second device 130B receives the packets M1B and M2B, equivalent to the media packet M1, at both times t1 and t2, thus there is no packet distortion.

As discussed above, the media packets are transmitted from the source device 110 to the first device 120 over the FBC 140, as well as to the second devices 130 over the media UCs 150. In order to reduce the effect of the packet distortion of the FBC 140 where the feedback signals including ACK and NAK are available, the backward error correction, such as discussed in FIG. 6 can be used. In order to reduce the effect of the packet distortion of the media 150 where the feedback signals are not available from the second devices 130, each media packet can be retransmitted at least one time, as shown in FIG. 7. In an example, multiple NAKs can be retransmitted from the first device 120 to the source device 110 even when the first device 120 receives a media packet transmitted by the source device. In an example, the source device 110 can be set to retransmit a media packet one or more times without receiving the NAK.

Various error correction techniques, including the packet-level FEC and the retransmission of media packets, can be implemented using any suitable wireless communication standard, such as IEEE 802.11 or Wi-Fi, IEEE 802.15.1 or Bluetooth, and the like. In an example, communication of media packets and recovery packets used in packet-level FECs, such as shown in FIG. 6, can be implemented with Bluetooth according to an advanced audio distribution profile (A2DP) for audio packets. In addition, an asynchronous connectionless (ACL) link can be used for the FBC 140. In another example, a retransmission of media packets, such as voice packets shown in FIG. 7, can be implemented over a synchronous connection-oriented (SCO) or extended SCO (eSCO) link using Bluetooth.

Figure 8:
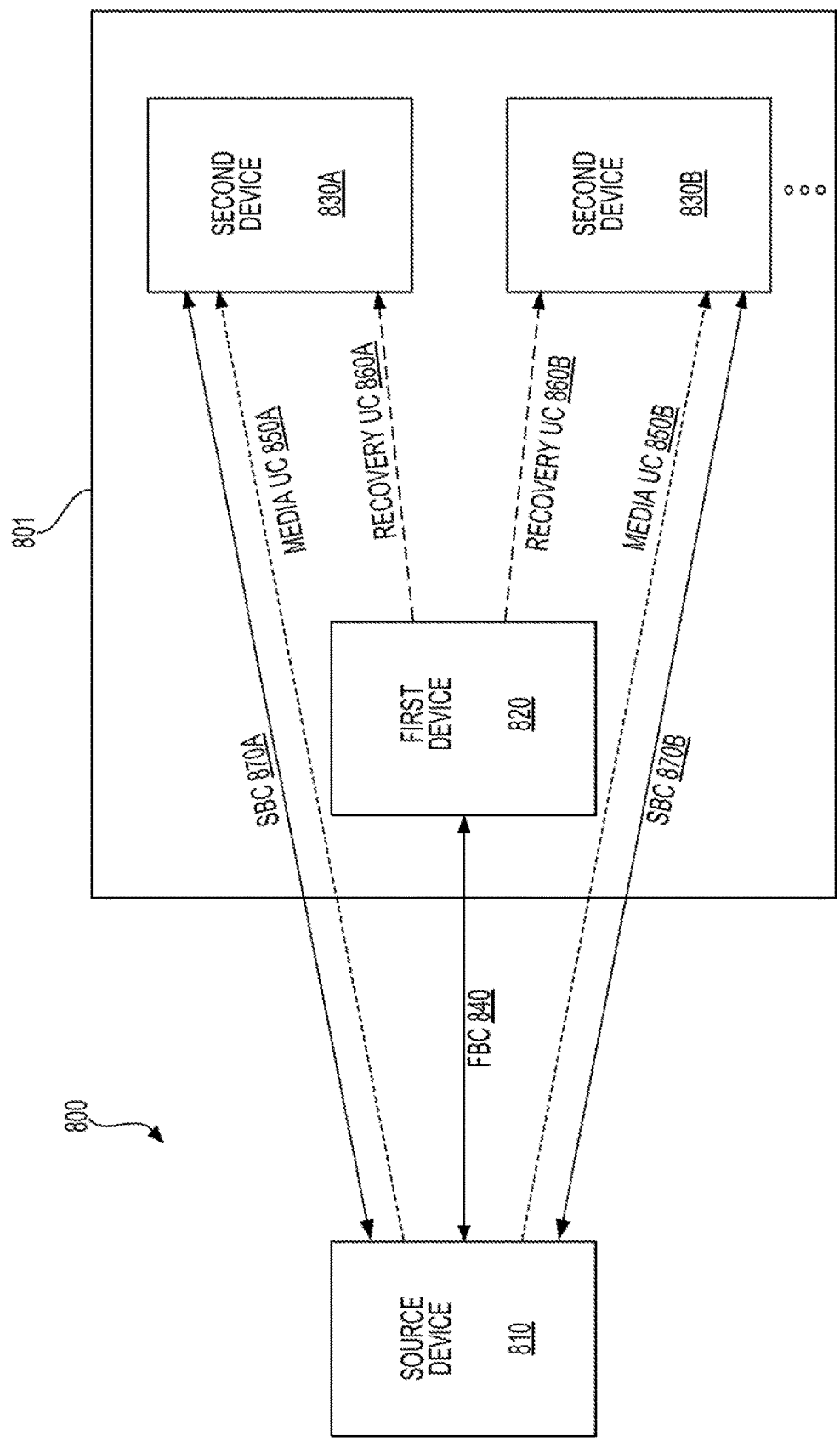
FIG. 8 shows an exemplary wireless communication system 800 according to an embodiment of the disclosure.

FIG. 8 shows an exemplary wireless communication system 800 according to an embodiment of the disclosure. The wireless communication system 800 can include a source device 810 and a wireless media system 801 including a first device 820, and one or more second devices 830A, 830B, and etc. The FBC 840, each media UC 850, each recovery UC 860, and each wired channel 880 function similarly to the FBC 140, each media UC 150, each recovery UC 160, and each wired channel 180 respectively. The source device 810 and the first device 820 can be configured to have similar components as that of the source device 110 and the first device 120 in the wireless communication system 100, respectively, thus, the description of the components that are identical will be omitted here for clarity purposes.

Each second device 830 can further include a transmitter and transmit signals to the source device 810 while each second device 130 in the wireless communication system 100 can be configured not to transmit signals to the source device 110 and the first device 120. Therefore, the operation of the second devices 830 and the wireless communication system 800 can differ from that of the second devices 130 and the wireless communication system 100 in a number of aspects.

In an embodiment, a second bidirectional wireless communication channel or a second bidirectional channel (SBC) 870 is formed between the source device 810 and each second device 830 by transmitting a SBC control signal from the source device 810 to each second device 830. Hence, signals can be communicated between the source device 810 and each second device 830 over the SBC 870. In an example, the SBC control signal can include information, such as address of the source device 810, timing and frequency information, and the like.

In an embodiment, each second device 830 can generate and transmit a player response to the source device 810. For example, the player response can include information of the packet distortion of the UCs, such as packet loss rates for the UCs and the second devices. A source response based on the player response can subsequently be transmitted from the source device 810 to the first device 820 over the FBC 840 so that the first device 820 can adjust the error correction techniques accordingly. The source response can include information of the packet distortion of the UCs, such as packet loss rates. In an example, the source response can include the largest packet loss rate from one or more player responses. In an example, a ratio N/M of a N/M packet-level FEC can be adjusted by the first device 820 according to the source response. In an example, the player and source responses are identical. In another example, the source response can be generated by the source device 810 based on the one or more player responses.

In an embodiment, the UC control signal can be directly transmitted from the first device 820 to the second devices 830, as discussed in FIG. 1. In another embodiment, the UC control signal can be transmitted via another device, such as the source device 810, i.e. from the first device 820 to the source device 810 over the FBC 840 and from the source device 810 to each second device 830 over the SBC 870. Transmitting the UC control signal via the source device 810 can be more efficient than multiple transmissions (such as three times as shown in FIG. 5) between the first device 120 and each second device 130 over each recovery UC 160. Further, the initialization of each second device 830 to include the UC key can be omitted.

The SBC 870 can be implemented by any suitable wireless communication standard, such as IEEE 802.11 or Wi-Fi, IEEE 802.15.1 or Bluetooth, and the like. In an embodiment, the wireless communication standards used by the FBC 840 and the SBC 870 can be identical. For example, the source device 810, the first device 820, and the second devices 830 form a Bluetooth piconet, for example, with the source device 810 as a master. In another example, the source device 810 and the first device 820 form a first Bluetooth piconet, and the source device 810 and the second devices 830 form a second Bluetooth piconet. In another embodiment, a first and second wireless communication standard are used by the FBC 840 and the SBC 870, respectively where the source device 810 can receive and transmit signals using the fast and second wireless communication standards, the first device 820 can receive and transmit signals using the first wireless communication standard, and each second device 830 can receive using the first and second wireless communication standard and transmit signals using the second wireless communication standard.

The source device 810 operates similarly to the source device 110 except that the source device 810 can form the SBC 870 with each second device 830. Therefore, the source device 810 can receive the UC control signal from the first device 820, and transmit the UC control signal to the second devices 830 over the SBC 870. In addition, the source device 810 can receive the player response from each second device 830 over the SBC 870 and then transmit the source response based on the one or more player responses to the first device 820. As discussed above, the source device 810 can receive and transmit signals using at least one wireless communication standard.

The first device 820 operates similarly as the first device 120 except that the first device 820 can receive from the source device 810 the source response. Both the player and source response can include information of the packet distortion of the UCs, such as packet loss rates.

The UC control signal can be used to form and maintain each media UC 850 and each recovery UC 860. In an embodiment, the UC control signal can be transmitted via the source device 110, i.e. from the first device 820 to the source device 810 over the FBC 840 and from the source device 810 to each second device 830 over the SBC 870. As discussed above, transmitting the UC control signal via the source device 110 can be more efficient than multiple transmissions between the first device 120 and each second device 130, such as that discussed in FIGS. 4 and 5.

Figure 9:
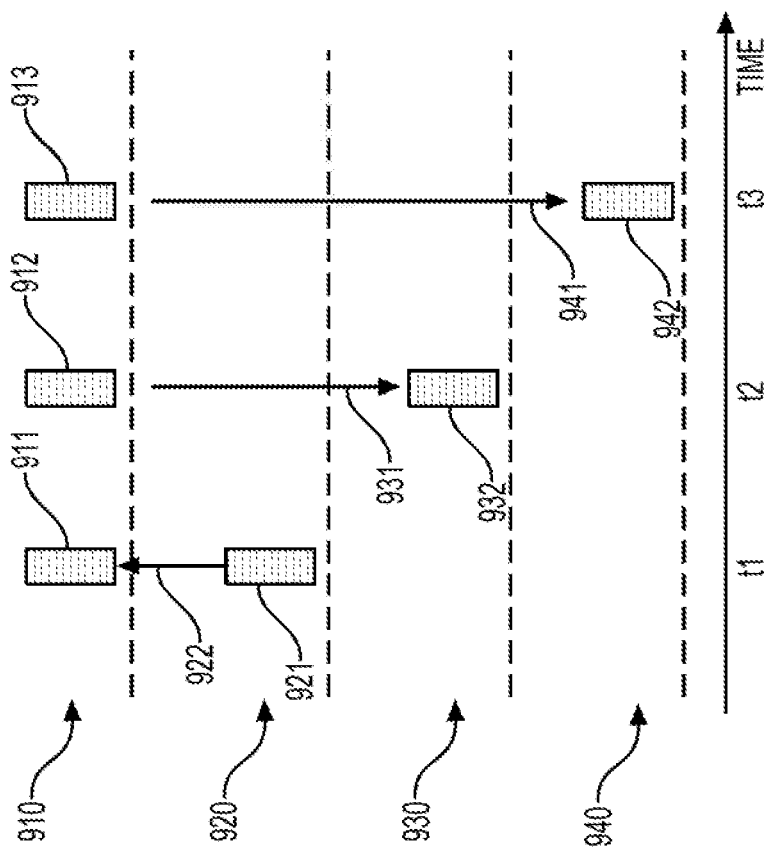
FIG. 9 shows an example of communication of control signals according to an embodiment of the disclosure.

FIG. 9 shows an example of communication of control signals according to an embodiment of the disclosure. In an example, the wireless communication system 800 can be configured to perform the communication shown in FIG. 9 to establish each media UC 850 and each recovery UC 860. The X-axis represents time, and the Y-axis represents the communication of the UC control signal for the source device 810 (row 910), the first device 820 (row 920), and the second devices 830A (row 930) and 830B (row 940), respectively.

Prior to time t1, the FBC 840 and the SBC 870 are formed using one or two suitable wireless communication standards while each media UC 850 and each recovery UC 860 are not formed. In an embodiment, the first device 820 is configured to generate the UC control signal 921 based on the FBC control signal where the UC control signal can include information, such as addresses of the source device 810 and the first device 820, timing and frequency information, and the like.

At time t1, the first device 820 is configured to transmit the UC control signal 921 to the source device 810, as indicated by an arrow 922, over the FBC 840. In an example, a signal 911, equivalent to the UC control signal 921 is received by the source device 810.

At times t2 and t3, the source device 810 is configure to transmit signals 912 and 913 to the second device 830A and 830B over the SBC 870, as indicated by arrows 931 and 941, respectively. The second device 830A and 830B receive signals 932 and 942, respectively. In an embodiment, the signals 912 and 913 are identical to the signal 911. In another embodiment, the signals 912 and 913 can be generated by the source device 810 based on the signal 911 and include information such as addresses of the source device 810 and the first device 820, timing and frequency information, and the like. After receiving the signals 932 and 942, the second devices 830 can form the media UCs 850 with the source device 810 and the recovery UCs 860 with the first device 820.

In another embodiment not shown in FIG. 9, the source device 810 can simultaneously transmit the signals 912 and 913 to the second devices 830A and 830B, respectively.

Figure 10:
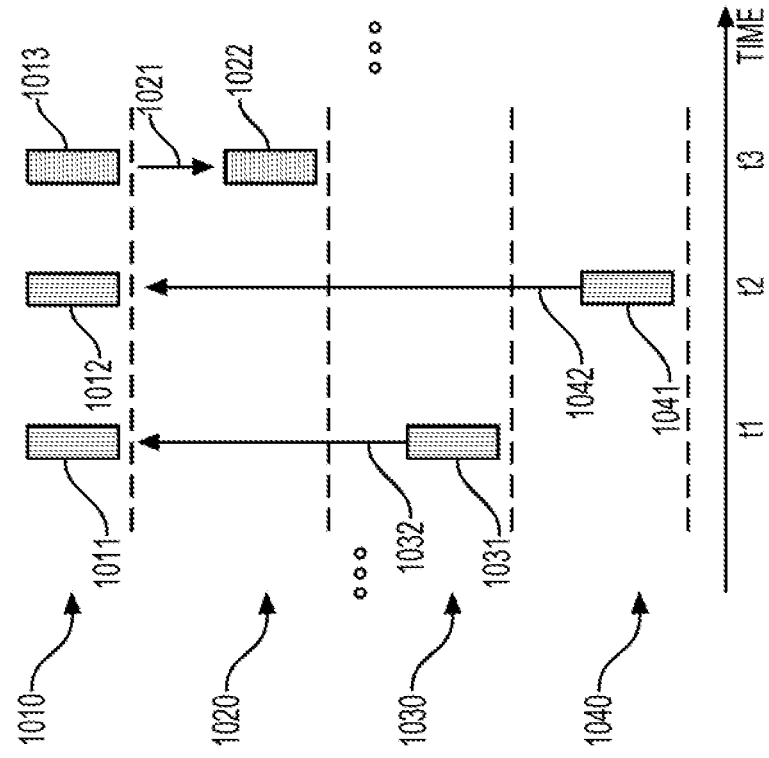
FIG. 10 shows an example of communication of control signals according to an embodiment of the disclosure.

As discussed above, the second devices 830 can be configured to transmit the player response to the first device 820 via the source device 810 over the SBC 870 and the FBC 840, respectively. FIG. 10 shows an example of communication of control signals according to an embodiment of the disclosure. In an example, the wireless communication system 800 can be configured to perform the communication shown in FIG. 10 when the FBC 840, the SBC 870, the media UCs 850, and the recovery UCs 860 are formed. The X-axis represents time, and the Y-axis represents the communication of the control signals for the source device 810 (row 1010), the first device 820 (row 1020), and the second devices 830A (row 1030) and 830B (row 1040), respectively.

At time t1, the second device 830A is configured to transmit a player response 1031 to the source device 810, as indicated by an arrow 1032, over the SBC 840. In an example, a signal 1011, equivalent to the player response 1031, is received by the source device 810.

At time t2, the second device 830B is configured to transmit a player response 1041 to the source device 810, as indicated by an arrow 1042, over the SBC 840. In an example, a signal 1012, equivalent to the player response 1041, is received by the source device 810.

In an embodiment, player responses, such as the player responses 1031 and 1041, can include information of the packet distortion of the UCs, such as packet loss rates for the UCs. For example, the player responses 1031 and 1041 include packet loss rates of 1% and 2% for the media UCs 850A and 850B, respectively.

After receiving one or more player responses, such as the signals 1011 and 1012 including the packet loss rates, the source device 810 transmits to the first device 820 over the FBC 840 a source response 1013 based on the one or more player responses, as indicated by an arrow 1021. In an example, the source response 1013 includes the largest packet loss rate of the player responses. Subsequently, the first device 820 can receive a signal 1022, equivalent to the source response 1013, and can adjust the error correction technique accordingly.

Figure 11:
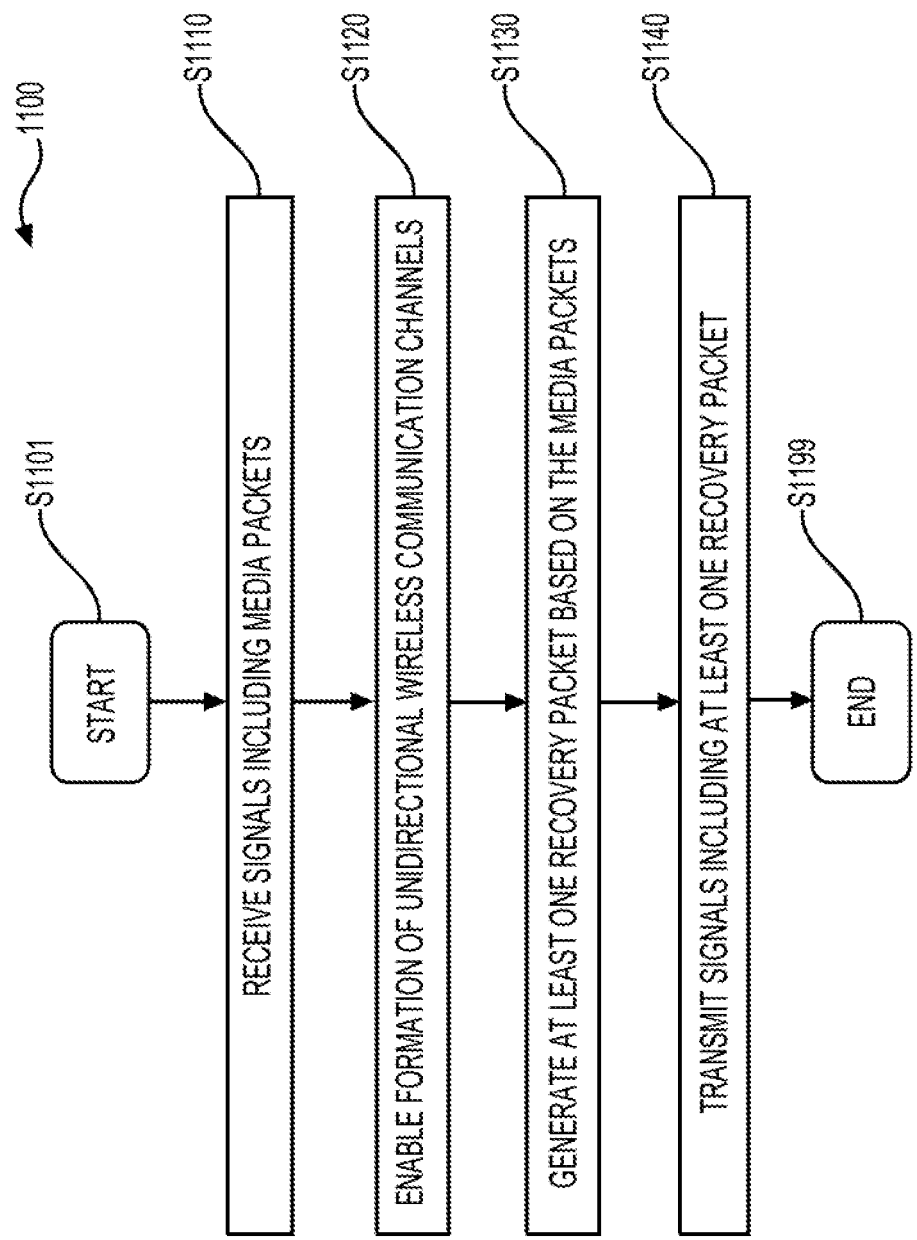
FIG. 11 shows a flow chart outlining an exemplary process 1100 according to an embodiment of the disclosure.

FIG. 11 shows a flow chart outlining an exemplary process 1100 according to an embodiment of the disclosure. In an example, the process 1100 is executed by the first device 120 in the wireless communication system 100. The process can enable wirelessly broadcasting the media packets as well as reducing the effect of the packet distortion. The process 1100 starts at S1101 when the FBC 140 is formed between the source device 110 and the first device 120, and proceeds to S1110.

At S1110, signals including the FBC control signal and the media packets can be received. In an example, the first device 120 can receive the FBC control signal and the media packets over the FBC 140 from the source device 110. In another embodiment, the signals can also include a source response from the source device 110 including information of the packet distortion of the UCs, such as the largest packet loss rate for the UCs. The source response can be generated by the source device 110 based on one or more player responses transmitted from one or more second devices 130 to the source device 110.

At S1120, formation of the UCs, such as the media UCs 150 and the recovery UCs 160, is enabled. In an embodiment, the UC control signal can be generated based on the FBC control signal by the first device 120. The UC control signal can include information, such as addresses of the source device 110 and the first device 120, timing and frequency information, and the like. Further, the UC control signal can be encrypted.

The UC control signal can subsequently be transmitted to the second devices 130 by the first device 120. After receiving the UC control signal the second devices 130 can form the media UCs 150 and the recovery UCs 160 with the source device 110 and the first device 120, respectively. As discussed above, the UC control signal can also be generated and transmuted periodically by the first device 120 based on the FBC control signal to maintain the media UCs 150 and the recovery UCs 160.

In an embodiment, the UC control signal can be wirelessly transmitted from the first device 120 to the second devices 130. In another embodiment, the UC control signal can be transmitted from the first device 120 to the second devices 130 using both wireless and wired communication methods. In an example, the UC control signal can be initially transmitted via wired connections from the first device 120 to the second devices 130, and subsequently transmitted wirelessly from the first device 120 to the second devices 130.

The UCs can be implemented using any suitable wireless communication standard. In an embodiment, a suitable wireless communication standard can be IEEE 802.11 or Wi-Fi, IEEE 802.15.1 or Bluetooth, or the like. In an embodiment, the media UCs 150 and the recovery UCs 160 can be implemented with Bluetooth. The process proceeds to S1130.

At S1130, one or more recovery packets are generated based on the media packets using an error correction technique, for example, by the first device 120. In an example, the error correction technique is a packet-level FEC, such as a N/M packet-level FEC where N and M represent numbers of the recovery packets and the media packets, respectively (N, M are integers and larger than zero). In another embodiment, the error correction technique, such as a ratio N/M of the N/M packet-level FEC, can be adjusted by the first device 120 according to the source response received at S1110.

At S1140, the one or more recovery packets are transmitted over the wireless communication channels. In an example, the first device 120 is configured to transmit the one or more recovery packets to the second devices 130 over the recovery UCs 160. Therefore, the second devices 130 can decode the received media packets along with the one or more recovery packets to recover the media packets transmitted by the source device 110, and thus reduce the effect of the packet distortion.

In another embodiment, the first device 120 is further configured to transmit feedback signals, such as the FBC ACK signals including ACK and NAK to acknowledge the recipient of a media packet, to the source device 110. For example, the source device 110 can retransmit the media packet when the FBC ACK signal is a NAK. Then the process proceeds to S1199 and terminates.

In another embodiment not shown in FIG. 11, the media packets can be played by the first device 120 using, for example, one or more speakers.

Figure 12:
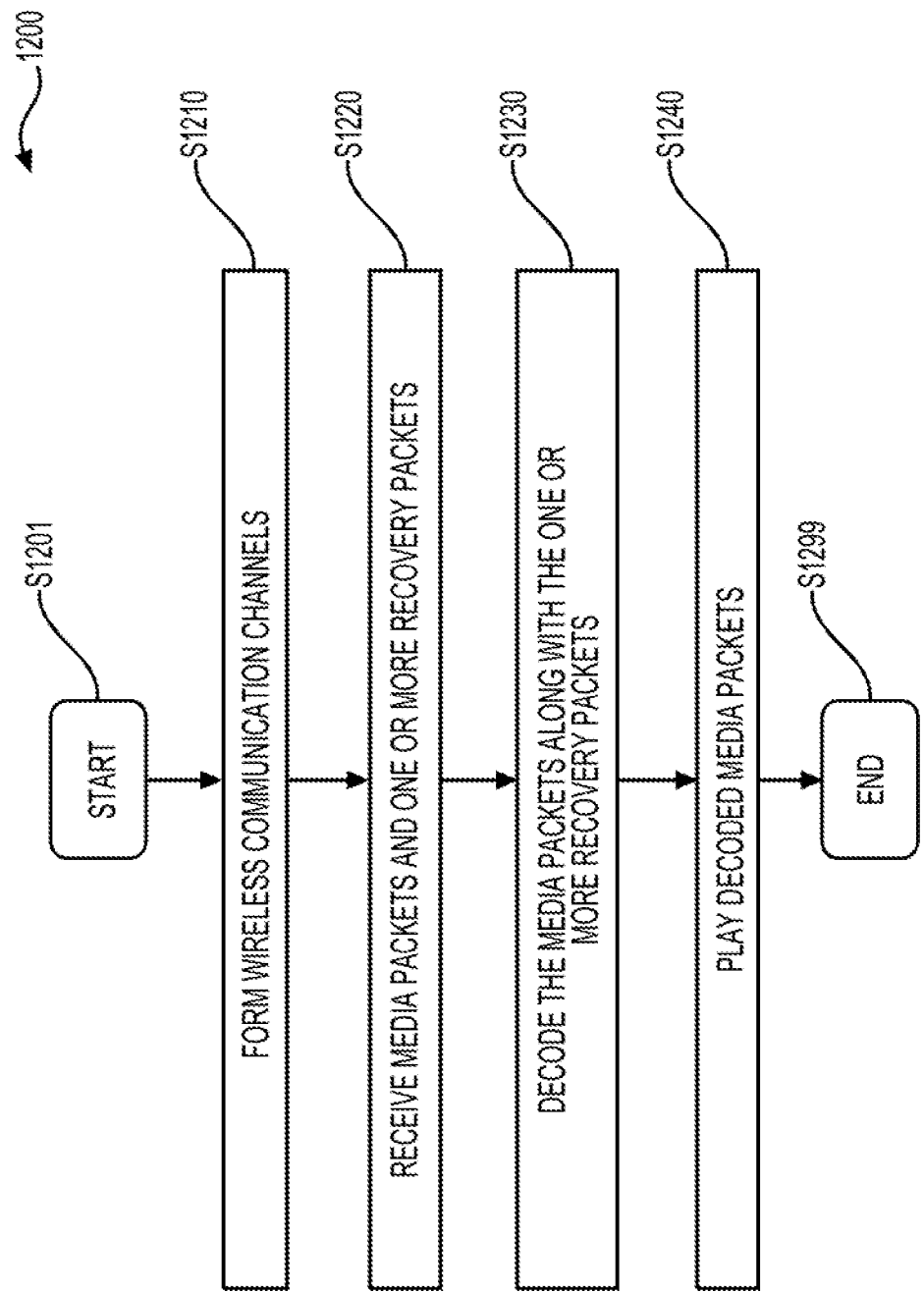
FIG. 12 shows a flow chart outlining an exemplary process 1200 according to an embodiment of the disclosure.

FIG. 12 shows a flow chart outlining an exemplary process 1200 according to an embodiment of the disclosure. In an example, the process 1200 is executed by one or more second devices 130 in the wireless communication system 100. As a result, the one or more wireless decoding devices can receive the media packets from a single device such as the source 110, and the effect of the packet distortion can be reduced. The process 1200 starts at S1201 when the FBC 140 is formed between the source device 110 and the first device 120, and proceeds to S1210.

At S1210, each second device 130 can receive the UC control signal, and the UCs including the media UCs 150 and the recovery UCs 160 are formed between each second device 130 and the source device 110 and the first device 120, respectively. The UC control signal can include information, such as addresses of the source device 110 and the first device 120, timing and frequency information, and the like. Further, the UC control signal can be encrypted, and each second device 130 can be initialized to have the UC key. The initialization of the second devices 130 to have the UC key can be implemented using hardware, software, firmware, or a combination of aforementioned methods.

In an embodiment, the UC control signal can be received wirelessly by the second devices 130. In another embodiment, the UC control signal can be received by the second devices 130 using both wireless and wired communication methods. In an example, the UC control signal can be initially received via wired connections by the second devices 130 from the first device 120, and subsequently received wirelessly by the second devices 130 from the first device 120.

The UCs can be implemented using any suitable wireless communication standard. In an embodiment, a suitable wireless communication standard can be IEEE 802.11 or Wi-Fi, IEEE 802.15.1 or Bluetooth, or the like. In an embodiment, the media UCs 150 and the recovery UCs 160 can be implemented with Bluetooth. The process proceeds to S1220.

At S1220, media packets and one or more recovery packets are received over the UCs. In an example, the second devices 130 receive the media packets from the source device 110 over the media UCs 150, and the one or more recovery packets from the first device 120 over the recovery UCs 160, respectively. In an embodiment the one or more recovery packets are generated by the first device 120 based on the media packets using an error correction technique, such as a packet-level FEC in order to reduce the effect of the packet distortion.

At S1230, the media packets along with the one or more recovery packets are decoded. In an example, the second devices 130 are configured to decode the received media packets along with the one or more recovery packets in order to recover the media packets transmitted by, for example, the source device 110. In an embodiment, the second devices 130 can use a decoded method that matches the error correction technique used by the first device 120 to generate the one or more recovery packets.

At S1240, the decoded media packets are played by the second devices 130. In an example, the second devices 130 can play the decoded media packets by the respective speakers. Then the process proceeds to S1299 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A wireless encoding device, comprising:
an interface circuit configured to receive a bidirectional control signal and media packets from a source device, the bidirectional control signal indicating an address of the source device, timing, and frequency information for the source device; and
a controller configured to generate a unidirectional control signal based on the bidirectional control signal to enable one or more wireless decoding devices to receive the media packets from the source device and at least one recovery packet from the interface circuit of the wireless encoding device, and to generate the at least one recovery packet based on the media packets using a packet-level forward error correction technique to enable the one or more wireless decoding devices to recover distorted media packets received from the source device, the unidirectional control signal including the address, the timing, and the frequency information for the source device.

2. The wireless encoding device of claim 1, wherein the interface circuit is further configured to form a first bidirectional wireless communication channel with the source device based on the bidirectional control signal and to form a recovery unidirectional wireless communication channel with each of the one or more wireless decoding devices based on the unidirectional control signal.

3. The wireless encoding device of claim 1, wherein the controller is further configured to encrypt the unidirectional control signal.

4. The wireless encoding device of claim 1, wherein the interface circuit is further configured to transmit the at least one recovery packet and the unidirectional control signal and to receive the bidirectional control signal and the media packets using a wireless communication standard.

5. The wireless encoding device of claim 4, wherein the wireless communication standard is Bluetooth (IEEE 802.15.1).

6. The wireless encoding device of claim 1, further comprising one or more speakers configured to play the media packets.

7. The wireless encoding device of claim 1, wherein the interface circuit is further configured to receive a source response from the source device that is based on one or more player responses received by the source device from the one or more wireless decoding devices, respectively.

8. The wireless encoding device of claim 7, wherein the controller is further configured to adjust the packet-level forward error correction technique based on the source response.

9. A wireless decoding device, comprising:
an interface circuit configured to receive a unidirectional control signal and at least one recovery packet from a wireless encoding device and to receive media packets from a source device; and
a controller configured to process the unidirectional control signal to form a media unidirectional wireless communication channel between the wireless decoding device and the source device and a recovery unidirectional wireless communication channel between the wireless decoding device and the wireless encoding device, and to decode received media packets along with the at least one recovery packet using an error correction technique to recover distorted media packets received from the source device.

10. The wireless decoding device of claim 9, wherein the interface circuit is further configured to form the media unidirectional wireless communication channel with the source device and the recovery unidirectional wireless communication channel with the wireless encoding device using a wireless communication standard.

11. The wireless decoding device of claim 10, wherein the wireless communication standard is Bluetooth (IEEE 802.15.1).

12. The wireless decoding device of claim 9, further comprises one or more speakers to play the decoded media packets.

13. The wireless decoding device of claim 9, wherein the interface circuit further includes a key to decrypt the unidirectional control signal encrypted by the wireless encoding device.

14. The wireless decoding device of claim 9, wherein the controller further comprises a response processor configured to generate a player response based on packet distortion of the unidirectional wireless communication channels and the interface circuit further comprises a transmitter configured to enable the wireless decoding device to form a second bidirectional wireless communication channel with the source device wherein the unidirectional control signal is transmitted from the wireless encoding device to the source device and then from the source device to the wireless decoding device over the second bidirectional wireless communication channel and the player response is transmitted from the wireless decoding device to the source device over the second bidirectional wireless communication channel and then a source response based on the one or more player responses is transmitted from the source device to the wireless encoding device.

15. A method for wirelessly broadcasting media packets, comprising:
receiving a bidirectional control signal and media packets from a source device by a wireless encoding device, the bidirectional control signal indicating an address of the source device, timing, and frequency information for the source device;
generating a unidirectional control signal based on the bidirectional control signal by the wireless encoding device, the unidirectional control signal including the address, the timing, and the frequency information for the source device;
generating at least one recovery packet based on the media packets using a packet-level forward error correction technique by the wireless encoding device;
transmitting, by the wireless encoding device, the unidirectional control signal to enable one or more wireless decoding devices to form a media unidirectional wireless communication channel with the source device and receive the media packets from the source device, and to enable the one or more wireless decoding devices to form a recovery unidirectional wireless communication channel with the wireless encoding device; and
transmitting, by the wireless encoding device, the at least one recovery packet that enables the one or more wireless decoding devices to recover distorted media packets received from the source device.

16. The method of claim 15, further comprising:
receiving, at the wireless decoding device, the unidirectional control signal to form the media unidirectional wireless communication channel with the source device and to form the recovery unidirectional wireless communication channel with the wireless encoding device;
receiving, at the wireless decoding device, the media packets transmitted by the source device and the at least one recovery packet transmitted by the wireless encoding device; and
decoding the received media packets along with the at least one recovery packet using the packet-level forward error correction technique to recover the distorted media packets from the source device; and
playing the decoded media packets by the wireless decoding device.

17. The method of claim 16, wherein the one or more wireless decoding devices are configured to include a key to decrypt the unidirectional control signal encrypted by the wireless encoding device.

18. The method of claim 16, wherein the wireless decoding device periodically receives the unidirectional control signal from the wireless encoding device, and the wireless decoding device receives an initial unidirectional control signal from the wireless encoding device via a wired connection.

19. The method of claim 16, further comprising:
forming a first bidirectional wireless communication channel between the wireless encoding devices and the source device based on the bidirectional control signal;
forming a second bidirectional wireless communication channel between each of the one or more wireless decoding devices and the source device;
transmitting the unidirectional control signal from the wireless encoding device to the wireless decoding device via the source device over the first and second bidirectional wireless communication channels;
transmitting one or more player responses from the one or more wireless decoding devices to the source device over the second bidirectional wireless communication channel;
transmitting a source response based on the one or more player responses from the source device to the wireless encoding device over the first bidirectional wireless communication channel; and
adjusting the packet-level forward error correction technique based on the source response.

* * * * *